United States Patent
Go et al.

(10) Patent No.: US 8,069,279 B2
(45) Date of Patent: Nov. 29, 2011

(54) DATA FLOW CONTROL WITHIN AND BETWEEN DMA CHANNELS

(75) Inventors: Dominic Go, San Jose, CA (US); Mark D. Hayter, Menlo Park, CA (US); Puneet Kumar, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 472 days.

(21) Appl. No.: 11/682,051

(22) Filed: Mar. 5, 2007

(65) Prior Publication Data

US 2008/0222317 A1    Sep. 11, 2008

(51) Int. Cl.
G06F 3/00 (2006.01)
G06F 15/167 (2006.01)

(52) U.S. Cl. .......................................... 710/22; 709/212

(58) Field of Classification Search ....................... 710/22
See application file for complete search history.

(56) References Cited

U.S. PATENT DOCUMENTS

| | | | |
|---|---|---|---|
| 5,075,846 A * | 12/1991 | Reininger et al. ............... | 700/90 |
| 5,404,522 A | 4/1995 | Carmon et al. | |
| 5,634,069 A * | 5/1997 | Hicok et al. ...................... | 710/33 |
| 5,640,399 A | 6/1997 | Rostoker et al. | |
| 5,978,866 A | 11/1999 | Nain | |
| 6,038,629 A | 3/2000 | Ogilvie | |
| 6,070,182 A | 5/2000 | Rao et al. | |
| 6,209,046 B1 | 3/2001 | Sato et al. | |
| 6,874,040 B2 | 3/2005 | Gregg | |
| 6,948,010 B2 | 9/2005 | Somers et al. | |
| 7,089,344 B1 | 8/2006 | Rader et al. | |
| 7,139,848 B1 | 11/2006 | Murray et al. | |
| 7,260,688 B1 * | 8/2007 | Baxter et al. ................... | 711/147 |
| 7,386,642 B2 | 6/2008 | Inoue et al. | |
| 7,461,190 B2 * | 12/2008 | Subramanian et al. ........ | 710/112 |
| 7,496,695 B2 | 2/2009 | Go et al. | |
| 7,548,997 B2 | 6/2009 | Go | |
| 7,620,746 B2 | 11/2009 | Go et al. | |
| 2003/0097498 A1* | 5/2003 | Sano et al. ...................... | 710/22 |
| 2004/0064600 A1 | 4/2004 | Sing | |
| 2004/0068590 A1 | 4/2004 | Nishino | |
| 2006/0009695 A1 | 1/2006 | Mathew et al. | |

(Continued)

FOREIGN PATENT DOCUMENTS

WO    0235368    2/2002

OTHER PUBLICATIONS

U.S. Appl. No. 11/238,790, filed Sep. 29, 2005.

(Continued)

Primary Examiner — Henry Tsai
Assistant Examiner — Juanito Borromeo
(74) Attorney, Agent, or Firm — Lawrence J. Merkel; Meyertons, Hood, Kivlin, Kowert & Goetzel, P.C.

(57) ABSTRACT

In one embodiment, a direct memory access (DMA) controller comprises a transmit circuit and a data flow control circuit coupled to the transmit circuit. The transmit circuit is configured to perform DMA transfers, each DMA transfer described by a DMA descriptor stored in a data structure in memory. There is a data structure for each DMA channel that is in use. The data flow control circuit is configured to control the transmit circuit's processing of DMA descriptors for each DMA channel responsive to data flow control data in the DMA descriptors in the corresponding data structure.

30 Claims, 8 Drawing Sheets

U.S. PATENT DOCUMENTS

2006/0015748 A1     1/2006    Goto et al.
2007/0022225 A1     1/2007    Nair et al.

OTHER PUBLICATIONS

U.S. Appl. No. 11/682,065, filed Mar. 5, 2007.
U.S. Appl. No. 11/238,850, filed Sep. 29, 2005.
James B. Keller, "The PWRficient Processor Family," PA Semi, Oct. 2005, 31 pages.
Office Action in U.S. Appl. No. 11/238,790 mailed Apr. 15, 2008.
Response to Office Action in U.S. Appl. No. 11/238,790 filed Jun. 24, 2008.
ARM Limited: "PrimeCell Single Master DMA Controller (PL081);" Revision r1p1, Feb. 2003, 90 pages;.
IBM: "DMA Slave Data Security," Technical Disclosure Bulletin, vol. 34, No. 12, May 1, 1992, p. 327, XP002423605; 90 pages.
Office Action from U.S. Appl. No. 11/620,875 mailed Jul. 24, 2008.
Response to Office Action from U.S. Appl. No. 11/620,875 filed Oct. 15, 2008.
Office Action from U.S. Appl. No. 11/238,850 mailed Jul. 21, 2008.
Response to Office Action from U.S. Appl. No. 11/238,850 filed Oct. 15, 2008.
Office Action from U.S. Appl. No. 11/238,790 mailed Oct. 14, 2008.
"Microsoft Computer Dictionary," 2002, Microsoft Press, 5th Edition, p. 335.
Office Action from U.S. Appl. No. 11/238,850, mailed Dec. 31, 2008.
Office Action from U.S. Appl. No. 11/620,875, mailed Jan. 8, 2009.
Office Action from U.S. Appl. No. 11/682,065, mailed Apr. 13, 2009.

* cited by examiner

DATA FLOW CONTROL WITHIN AND BETWEEN DMA CHANNELS

BACKGROUND

1. Field of the Invention

This invention is related to the field of direct memory access (DMA) controllers in computer systems.

2. Description of the Related Art

In a typical system that includes one or more processors, memory, and input/output (I/O) devices or interfaces, direct memory access (DMA) transfers are often used to transfer data between the I/O and the memory. In some systems, individual DMA circuitry is included in each I/O device or interface that uses DMA. In other systems, one or more I/O devices may share DMA circuitry.

Often, data is DMA transferred to memory to be processed by the processors, or data is created by the processors for DMA transferred to I/O. For example, packet data from a network interface, such as transport control protocol/internet protocol (TCP/IP) packets, are often received and processed. The processed packets may also be transmitted again, and the processors may also generate packets for transmission.

The "load" of processing the DMA data may be fairly large, and may impact the ability of the processors to execute other processing tasks. Some of the DMA processing may be fairly regular and well-defined. For example, packets may be encrypted and/or authenticated. Accordingly, received packets may have to be unencrypted by the processor and/or may have to be authenticated before other processing of the packets. Similarly, packets prepared for transmission may have to be encrypted and/or have authentication information (such as a hash of the packet data) generated. To the extent that the processing of DMA data presents an excessive load to the processor, performance in the system can be negatively impacted.

In some cases, hardware acceleration of some or all of the above tasks can be performed. In such cases, the data must generally be DMA transferred to the hardware accelerator, and the result data must be DMA transferred back to memory. A relatively complex task can involve multiple DMA transfers to and from various hardware accelerators. To ensure proper operation, a mechanism to control data flow between DMA transfers is needed.

SUMMARY

In one embodiment, a direct memory access (DMA) controller comprises a transmit circuit and a data flow control circuit coupled to the transmit circuit. The transmit circuit is configured to perform DMA transfers, each DMA transfer described by a DMA descriptor stored in a data structure in memory. There is a data structure for each DMA channel that is in use. The data flow control circuit is configured to control the transmit circuit's processing of DMA descriptors for each DMA channel responsive to data flow control data in the DMA descriptors in the corresponding data structure. A corresponding method is also contemplated.

In another embodiment, an apparatus comprises a host comprising a memory system; and a direct memory access (DMA) controller coupled to the host. The DMA controller is configured to perform DMA transfers, each DMA transfer described by a DMA descriptor stored in a data structure in the memory system. There is a data structure for each DMA channel that is in use, and the DMA controller is configured to control the processing of DMA descriptors for each DMA channel responsive to data flow control data in the DMA descriptors in the corresponding data structure.

BRIEF DESCRIPTION OF THE DRAWINGS

The following detailed description makes reference to the accompanying drawings, which are now briefly described.

Figure 1:
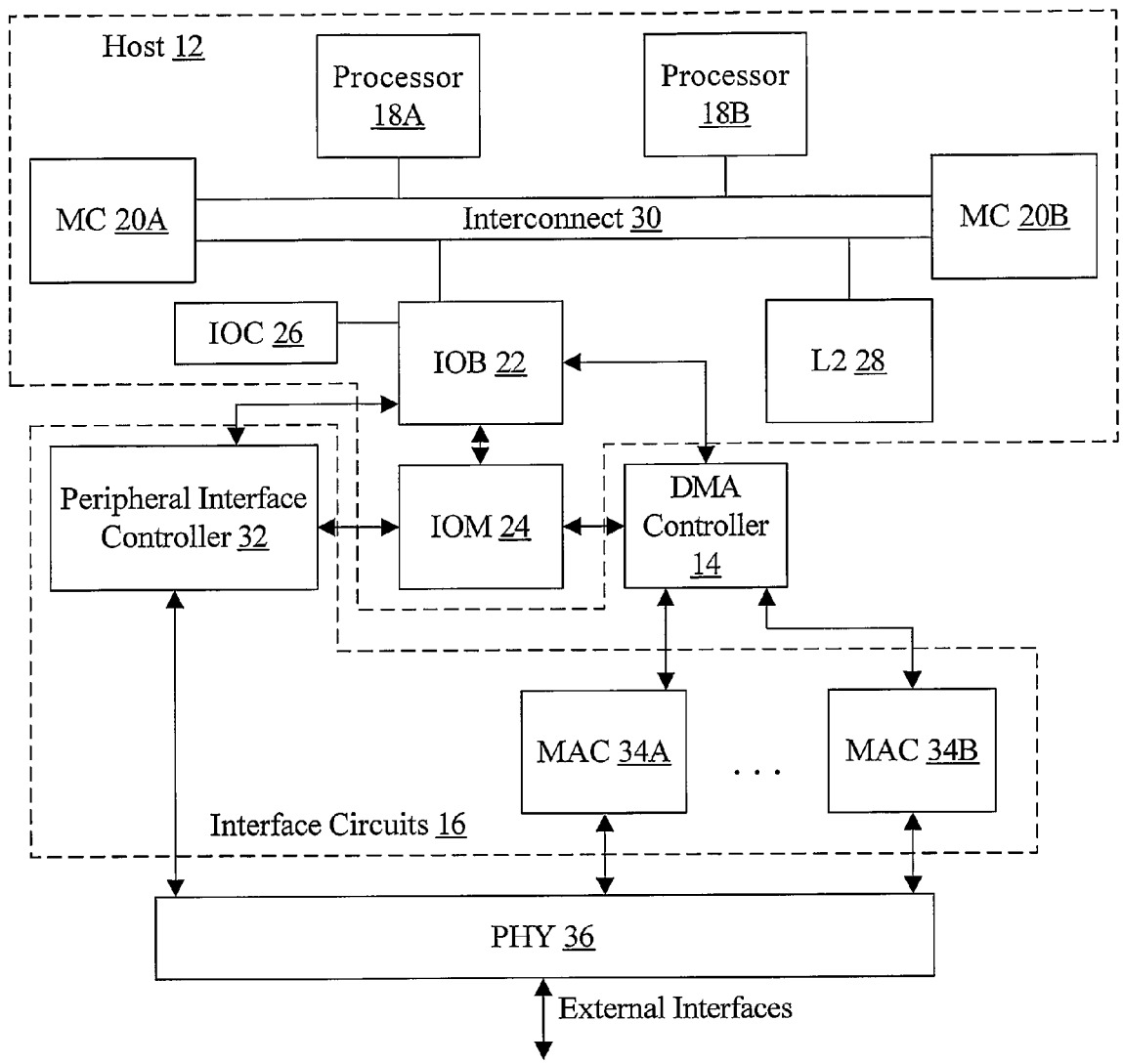
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system 10 is shown. In the illustrated embodiment, the system 10 includes a host 12, a DMA controller 14, interface circuits 16, and a physical interface layer (PHY) 36. The DMA controller 14 is coupled to the host 12 and the interface circuits 16. The interface circuits 16 are further coupled to the physical interface layer 36. In the illustrated embodiment, the host 12 includes one or more processors such as processors 18A-18B, one or more memory controllers such as memory controllers 20A-20B, an I/O bridge (IOB) 22, an I/O memory (IOM) 24, an I/O cache (IOC) 26, a level 2 (L2) cache 28, and an interconnect 30. The processors 18A-18B, memory controllers 20A-20B, IOB 22, and L2 cache 28 are coupled to the interconnect 30. The IOB 22 is further coupled to the IOC 26 and the IOM 24. The DMA controller 14 is also coupled to the IOB 22 and the IOM 24. In the illustrated embodiment, the interface circuits 16 include a peripheral interface controller 32 and one or more media access control circuits (MACs) such as MACs 34A-34B. The MACs 34A-34B are coupled to the DMA controller 14 and to the physical interface layer 36. The peripheral interface controller 32 is also coupled to the I/O bridge 22 and the I/O memory 34 (and thus indirectly coupled to the DMA controller 14) and to the physical interface layer 36. The peripheral interface controller 32 and the MACs 34A-34C each include configuration registers 38A-38C. In some embodiments, the components of the system 10 may be integrated onto a single integrated circuit as a system on a chip. In other embodiments, the system 10 may be implemented as two or more integrated circuits.

The host 12 may comprise one or more address spaces. At least a portion of an address space in the host 12 may be mapped to memory locations in the host 12. That is, the host 12 may comprise a memory system mapped to addresses in the host address space. For example, the memory controllers 20A-20B may each be coupled to memory (not shown) comprising the memory locations mapped in the address space. In some cases, the entirety of the address space may be mapped to the memory locations. In other cases, some of the address space may be memory-mapped I/O (e.g. the peripheral interface controlled by the peripheral interface controller 32 may include some memory-mapped I/O).

The DMA controller 14 is configured to perform DMA transfers between the interface circuits 16 and the host address space. Particularly, the DMA transfers may be between memory locations to which the address space is mapped and the interface circuits 16. Additionally, the DMA controller 14 may, in some embodiments, be configured to perform DMA transfers between sets of memory locations within the address space. That is, both the source and destination of such a DMA transfer may be memory locations. The functionality of a data mover may thus be incorporated into the DMA controller 14, and a separate data mover may not be required, in some embodiments. The programming model for the memory-to-memory DMA transfers may be similar to the programming model for other DMA transfers (e.g. DMA descriptors, described in more detail below). A memory-to-memory DMA transfer may also be referred to as a copy DMA transfer.

The DMA controller 14 may be configured to perform one or more operations (or "functions") on the DMA data as the DMA data is being transferred, in some embodiments. The operations may be performed on transfers between the address space and the interface circuits, and may also be performed on copy DMA transfers, in some embodiments. Operations performed by the DMA controller 14 may reduce the processing load on the processors 18A-18B, in some embodiments, since the processors need not perform the operations that the DMA controller 14 performs. In one embodiment, some of the operations that the DMA controller 14 performs are operations on packet data (e.g. encryption/decryption, cyclical redundancy check (CRC) generation or checking, checksum generation or checking, etc.). The operations may also include an exclusive OR (XOR) operation, which may be used for redundant array of inexpensive disks (RAID) processing, for example.

The DMA controller 14 may support various DMA channels for DMA transfers. Each channel may be an independent logical data path from a source to a destination. A complex task for the DMA controller functions (or other hardware accelerators, in some embodiments) may be divided across channels, or may be multiple DMA transfers within a single channel, or some combination of both. However, since the DMA transfers are part of a larger task, the transfers may actually have dependencies on each other. For example, one transfer may provide input data that is used by another transfer (e.g. a transfer may involve a function or other result generation that is used by the other transfer). Alternatively, DMA transfers may have an ordering dependency as part of the larger overall task. In order to provide for such dependencies while permitting the larger task to be established by software and then run to completion (assuming no errors in the task), the DMA controller 14 may support data flow control data in the DMA channels. In the absence of data flow control data, the DMA controller 14 may be free to process DMA channels in parallel and to process descriptors within a channel in parallel (or overlapped in processing). When data flow control is needed to perform the set of DMA transfers properly to accomplish an overall task, the data flow control data may be included in the DMA channels. Generally, data flow control data may be any data that causes DMA transfers to be performed in a certain order that would not be guaranteed in the typical operation of the DMA controller for the channels.

One set of data flow control data, for one embodiment, may include control descriptors that update flags in a set of flags implemented by the DMA controller 14 and control descriptors that wait on a given value in the flags. A source DMA channel may include one or more DMA descriptors to perform DMA transfers, followed by a control descriptor to update the flags. A target channel may include a control descriptor that waits on the update to the flags, and then one or more DMA transfers that are dependent on the DMA transfer(s) in the source channel. Any number of DMA channels may be data flow controlled in this fashion. Multiple channels may be flow controlled for a source channel by including control descriptors in those channels to wait on the same flag (updated by the source channel). Thus, a broadcast model from the source channel to several target channels may be supported. Similarly, multiple source dependencies may be handled in a target DMA channel by including multiple control descriptors waiting on the flags updated by each of those source channels.

While the above description refers to one flag update per control descriptor, other embodiments may permit multiple flag updates in one control descriptor, as desired. Similarly, while the above description refers to a control descriptor that waits on a value in one flag, other embodiments may support waiting on values of multiple flags, if desired.

In another embodiment, dependent DMA transfers may be included in the same DMA channel. While DMA transfers in the same channel may generally be attempted in the order listed, there is nothing that prevents parallel processing of DMA transfers (e.g. prefetching DMA descriptors and/or data for the next transfer while a current transfer is being performed, or even performing transfers to different targets concurrently, in some embodiments). To avoid such parallel processing/prefetching for cases where a dependency exists, data flow control data may be included in the DMA descriptors themselves. For example, an embodiment of the DMA descriptors may include a serialize indication to indicate whether or not the DMA transfer specified by a given descriptor should be serialized with subsequent descriptors. The DMA controller may inhibit any parallel processing/prefetching if the serialize indication indicates serialization.

In some embodiments, both the serialize indication and the flags may be implemented. In such cases, for example, the serialize indication may indicate serialize in the DMA descriptor prior to the control descriptor that updates the flags. Alternatively, the DMA controller 14 may automatically serialize control descriptors that update the flags with preceding DMA descriptors.

In general, DMA transfers may be transfers of data from a source to a destination, where at least one of the destinations is a memory location or other address(es) in the host address space. The DMA transfers are accomplished without the transferred data passing through the processor(s) in the system (e.g. the processors 18A-18B). The DMA controller 14 may accomplish DMA transfers by reading the source and writing the destination. For example, a DMA transfer from memory to an interface circuit 16 may be accomplished by the DMA controller 14 generating memory read requests (to the IOB 22, in the illustrated embodiment, which performs coherent read transactions on the interconnect 30 to read the data) and transmitting the read data as DMA data to the interface circuit 16. In one embodiment, the DMA controller 14 may generate read requests to read data into the IOM 24 for a DMA transfer through the peripheral interface controller 32, and the peripheral interface controller 32 may read the data from the IOM 24 and transmit the data. A DMA transfer from an interface circuit 16 to memory may be accomplished by the DMA controller 14 receiving data from the interface circuit 16 and generating memory write requests (to the IOB 22, in the illustrated embodiment) to transfer the DMA data to memory. In one embodiment, the peripheral interface controller 32 may write data to the IOM 24, and the DMA controller 14 may cause the data to be written to memory. Thus, the DMA controller 14 may provide DMA assist for the peripheral interface controller 32. Copy DMA transfers may be accomplished by generating memory read requests to the source memory locations and memory write requests to the destination memory locations (including the DMA data from the memory read requests).

The host 12 may generally comprise one or more processors and memory controllers configured to interface to memory mapped into the host 12's address space. The host 12 may optionally include other circuitry, such as the L2 cache 28, to enhance the performance of the processors in the host 12. Furthermore, the host 12 may include circuitry to interface to various I/O circuits and the DMA controller 14. While one implementation of the host 12 is illustrated in FIG. 1, other embodiments may include any construction and interface to the DMA controller 14 and interface circuits 16.

The processors 18A-18B comprise circuitry to execute instructions defined in an instruction set architecture implemented by the processors 18A-18B. Any instruction set architecture may be implemented in various embodiments. For example, the PowerPC™ instruction set architecture may be implemented. Other exemplary instruction set architectures may include the ARM™ instruction set, the MIPS™ instruction set, the SPARC™ instruction set, the x86 instruction set (also referred to as IA-32), the IA-64 instruction set, etc.

The memory controllers 20A-20B comprise circuitry configured to interface to memory. For example, the memory controllers 20A-20B may be configured to interface to dynamic random access memory (DRAM) such as synchronous DRAM (SDRAM), double data rate (DDR) SDRAM, DDR2 SDRAM, Rambus DRAM (RDRAM), etc. The memory controllers 20A-20B may receive read and write transactions for the memory to which they are coupled from the interconnect 30, and may perform the read/write operations to the memory. The read and write transactions may include read and write transactions initiated by the IOB 22 on behalf of the DMA controller 14 and/or the peripheral interface controller 32. Additionally, the read and write transactions may include transactions generated by the processors 18A-18B and/or the L2 cache 28.

The L2 cache 28 may comprise a cache memory configured to cache copies of data corresponding to various memory locations in the memories to which the memory controllers 20A-20B are coupled, for low latency access by the processors 18A-18B and/or other agents on the interconnect 30. The L2 cache 28 may comprise any capacity and configuration (e.g. direct mapped, set associative, etc.).

The IOB 22 comprises circuitry configured to communicate transactions on the interconnect 30 on behalf of the DMA controller 14 and the peripheral interface controller 32. The interconnect 30 may support cache coherency, and the IOB 22 may participate in the coherency and ensure coherency of transactions initiated by the IOB 22. In the illustrated embodiment, the IOB 22 employs the IOC 26 to cache recent transactions initiated by the IOB 22. The IOC 26 may have any capacity and configuration, in various embodiments, and may be coherent. The IOC 26 may be used, e.g., to cache blocks of data which are only partially updated due to reads/writes generated by the DMA controller 14 and the peripheral interface controller 32. Using the IOC 26, read-modify-write sequences may be avoided on the interconnect 30, in some cases. Additionally, transactions on the interconnect 30 may be avoided for a cache hit in the IOC 26 for a read/write generated by the DMA controller 14 or the peripheral interface controller 32 if the IOC 26 has sufficient ownership of the cache block to complete the read/write. Other embodiments may not include the IOC 26.

The IOM 24 may be used as a staging buffer for data being transferred between the IOB 22 and the peripheral interface 32 or the DMA controller 14. Thus, the data path between the IOB 22 and the DMA controller 14/peripheral interface controller 32 may be through the IOM 24. The control path (including read/write requests, addresses in the host address space associated with the requests, etc.) may be between the IOB 22 and the DMA controller 14/peripheral interface controller 32 directly. The IOM 24 may not be included in other embodiments.

The interconnect 30 may comprise any communication medium for communicating among the processors 18A-18B, the memory controllers 20A-20B, the L2 cache 28, and the IOB 22. For example, the interconnect 30 may be a bus with coherency support. The interconnect 30 may alternatively be a point-to-point interconnect between the above agents, a packet-based interconnect, or any other interconnect. The interconnect may be coherent, and the protocol for supporting coherency may vary depending on the interconnect type.

The interface circuits 16 generally comprise circuits configured to communicate on an interface to the system 10 according to any interface protocol, and to communicate with other components in the system 10 to receive communications to be transmitted on the interface or to provide communications received from the interface. The interface circuits may be configured to convert communications sourced in the system 10 to the interface protocol, and to convert communications received from the interface for transmission in the system 10. For example, interface circuits 16 may comprise circuits configured to communicate according to a peripheral interface protocol (e.g. the peripheral interface controller 32). As another example, interface circuits 16 may comprise circuits configured to communicate according to a network interface protocol (e.g. the MACs 34A-34B).

The MACs 34A-34B may comprise circuitry implementing the media access controller functionality defined for network interfaces. For example, one or more of the MACs 34A-34B may implement the Gigabit Ethernet standard. One or more of the MACs 34A-34B may implement the 10 Gigabit Ethernet Attachment Unit Interface (XAUI) standard. Other embodiments may implement other Ethernet standards, such as the 10 Megabit or 100 Megabit standards, or any other network standard. In one implementation, there are 6 MACs, 4 of which are Gigabit Ethernet MACs and 2 of which are XAUI MACs. Other embodiments may have more or fewer MACs, and any mix of MAC types.

Among other things, the MACs 34A-34B that implement Ethernet standards may strip off the inter-frame gap (IFG), the preamble, and the start of frame delimiter (SFD) from received packets and may provide the remaining packet data to the DMA controller 14 for DMA to memory. The MACs 34A-34D may be configured to insert the IFG, preamble, and SFD for packets received from the DMA controller 14 as a transmit DMA transfer, and may transmit the packets to the PHY 36 for transmission.

The peripheral interface controller 32 comprises circuitry configured to control a peripheral interface. In one embodiment, the peripheral interface controller 32 may control a peripheral component interconnect (PCI) Express interface. Other embodiments may implement other peripheral interfaces (e.g. PCI, PCI-X, universal serial bus (USB), etc.) in addition to or instead of the PCI Express interface.

The PHY 36 may generally comprise the circuitry configured to physically communicate on the external interfaces to the system 10 under the control of the interface circuits 16. In one particular embodiment, the PHY 36 may comprise a set of serializer/deserializer (SERDES) circuits that may be configured for use as PCI Express lanes or as Ethernet connections. The PHY 36 may include the circuitry that performs 8b/10b encoding/decoding for transmission through the SERDES and synchronization first-in, first-out (FIFO) buffers, and also the circuitry that logically configures the SERDES links for use as PCI Express or Ethernet communication links. In one implementation, the PHY may comprise 24 SERDES that can be configured as PCI Express lanes or Ethernet connections. Any desired number of SERDES may be configured as PCI Express and any desired number may be configured as Ethernet connections.

It is noted that, in various embodiments, the system 10 may include one or any number of any of the elements shown in FIG. 1 (e.g. processors, memory controllers, caches, I/O bridges, DMA controllers, and/or interface circuits, etc.).

Figure 2:
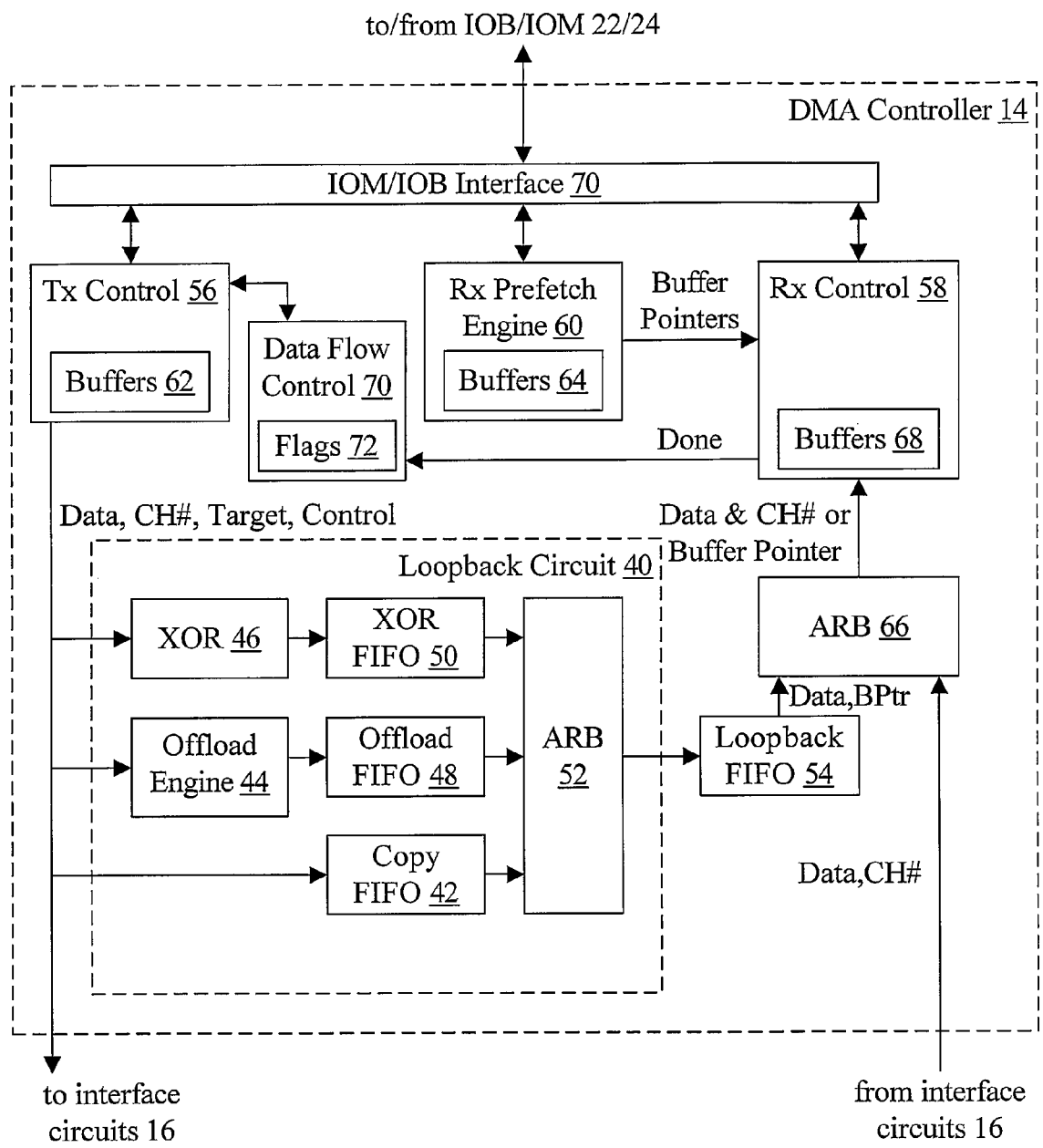
FIG. 2 is a block diagram of one embodiment of a DMA controller shown in FIG. 1.

Turning now to FIG. 2, a block diagram of one embodiment of the DMA controller 14 is shown. For the embodiment of FIG. 2, a descriptor software model for causing DMA transfers will be discussed. In some embodiments, a register-based software model may be supported in addition to or instead of the descriptor model. In a register-based model, each DMA transfer may be programmed into the DMA controller 14, and the DMA controller 14 may perform the DMA transfer. At completion of the transfer, the DMA controller 14 may either interrupt one of the processors 18A-18B or provide status (e.g. in a register within the DMA controller 14) that software may poll to determine when the DMA transfer has completed.

In the descriptor model, software may establish multiple DMA transfers to be performed using descriptor data structures in memory. Generally, a DMA descriptor may comprise a data structure in memory that describes a DMA transfer. The information in the DMA descriptor, for example, may specify the source and target of the DMA transfer, the size of the transfer, and various attributes of the transfer. In some cases, the source or target of the DMA transfer may be implicit. Multiple descriptors may be stored in a descriptor data structure in memory (e.g. in a "descriptor ring"), and the DMA controller 14 may be programmed with the address of the first descriptor in the data structure. The DMA controller 14 may read the descriptors and perform the indicated DMA transfers. A variety of control mechanisms may be used to control ownership of descriptors between software and hardware. For example, the descriptors may include valid bits or enable bits which indicate to the DMA controller 14 that the DMA transfer described in the descriptor is ready to be performed. An interrupt bit in a descriptor may be used to indicate that the DMA controller 14 is to interrupt the processor 18A-18B at the end of a given DMA transfer, or an end-of-transfer bit may be used to indicate that the descriptor describes the last DMA transfer and the DMA controller 14 should pause. Alternatively, the DMA controller 14 may implement descriptor count registers that may be incremented by software to indicate how many descriptors are available for the DMA controller 14 to process. The DMA controller 14 may decrement a descriptor count register to indicate that a prefetch of a descriptor has been generated. In other embodiments, the DMA controller 14 may decrement the descriptor count register to indicate consumption of a descriptor (i.e. performance of the specified DMA transfer). In still other embodiments, the DMA controller 14 may use a separate descriptor processed count register to indicate how many descriptors have been processed or prefetched.

The DMA controller 14 may perform transmit (Tx) DMA transfers and receive (Rx) DMA transfers. Tx DMA transfers have an address space in the host 12 as a source (e.g. memory locations in the memory coupled to the memory controllers 20A-20B). Rx DMA transfers have an address space in the host 12 as a target. Tx DMA transfers may have an interface circuit 16 as a target, or may have another address in the host 12 address space as a target (e.g. for copy DMA transfers). Tx DMA transfers that have host address space targets may use the Rx DMA data path to write the DMA data read from the source address to the target address.

In the illustrated embodiment, the DMA controller 14 comprises a Tx control circuit 56 on the Tx DMA data path, and an Rx control circuit 58 on the Rx DMA data path. The Tx control circuit 56 may prefetch data from the host 12 for transmit DMA transfers. Particularly, the Tx control circuit 56 may prefetch DMA descriptors, and may process the DMA descriptors to determine the source address for the DMA data. The Tx control circuit 56 may then prefetch the DMA data. While the term prefetch is used to refer to operation of the Tx control circuit 56, the prefetches may generally be read operations generated to read the descriptor and DMA data from the host address space.

As mentioned above, the DMA controller 14 may support various DMA channels Specifically, DMA channels may be supported for transmit DMA transfers and receive DMA transfers. Any number of channels may be supported, in various embodiments. For example, in one implementation, 20 transmit DMA channels may be provided and 64 receive DMA channels may be provided.

The channels may be assigned as desired by software. More particularly, each transmit channel may assigned to one of the interface circuits 16 or one of the loopback component circuits 42, 44, or 46 (described in more detail below). Not all transmit channels need be in use (that is, some transmit channels may be disabled). The Tx control circuit 56 may prefetch DMA descriptors and DMA data on a per-channel basis. That is, the Tx control circuit 56 may independently generate prefetches for each channel that has DMA descriptors available for processing. The Tx control circuit 56 may select among the generated prefetches to transmit read requests to the IOM/IOB interface unit 70.

Each receive channel may be assigned to one of the interface circuits 16. Not all receive channels need be in use (that is, some receive channels may be disabled). The Rx control circuit 58 may receive the channel number with received data. The loopback circuit 40 may supply a buffer pointer from the DMA descriptor for the DMA, and the Rx control circuit 58 may use the buffer pointer to write the DMA data to the host address space. The interface circuits 16 may be programmable with the assigned channels, or may employ packet filtering to determine a channel. The interface circuits 16 may supply the channel number with the DMA data, and the Rx control circuit 58 may use a buffer pointer provided from the Rx prefetch engine 60 for the channel to write the DMA data to the host address space. The Rx prefetch engine 60 may prefetch the buffer pointers from data structures in memory.

A data flow control circuit 70 is coupled to the Tx control circuit 56 and the Rx control circuit 58. In the illustrated embodiment, the data flow control circuit 70 includes a flags register 72. In other embodiments, there may be more than one flags register 72. The flags register 72 stores a set of flags that may be used to provide data flow control between DMA channels (and more particularly between transmit DMA channels). The data flow control circuit 70 may maintain the flags in the flags register 72 and may interface to the Tx control circuit 56 to perform the control descriptors that wait on values in the flags and which update the flags values. In one embodiment, the data flow control circuit 70 may also participate in the serialization of DMA transfers in the same channel as well. For example, if the Tx control circuit 56 encounters a control descriptor that waits on a value of a flag, the Tx control circuit 56 may provide an indication of the DMA channel, the flag, and the value being waited on to the data flow control circuit 70 and may stall processing for the DMA channel that included the descriptor. Similarly, if the Tx control circuit 56 detects a DMA descriptor that indicates serialization, the Tx control circuit 56 may generate the operations to perform the DMA transfer, may communicate the serialization request and the DMA channel number of the DMA channel that is serialized, and may stall processing for that DMA channel. In either case, when the Rx control circuit 58 indicates done for the channel, the data flow control circuit 70 may release the Tx control circuit 56 to process on that channel. Stalling of processing by the Tx control circuit 56 may include inhibiting any prefetching or parallel processing DMA transfers in the corresponding channel, and may further include inhibiting prefetching of DMA descriptors from the channel.

The Rx control circuit 58 may provide a done indication the data flow control circuit 70 to indicate that a DMA transfer to memory is complete. In one embodiment, the done indication may include a channel number indicating which DMA channel has a DMA transfer completing, and may also include a valid signal that may be asserted to indicate that a DMA transfer is being indicated as completed. Generally, the Rx control circuit 58 may indicate that the DMA transfer is complete, via the done indication, when the write operations that store the DMA data to memory are globally visible. A write operation may be viewed as globally visible if any read operation to the same memory location as the write and performed subsequent to the point at which the write becomes globally visible will return the data written by the write operation (until the write data is itself overwritten). The DMA data may also be referred to as globally visible if the DMA data is returned in response to a read of the memory locations to which the data was stored. For example, in one embodiment, a write operation is globally visible once it has been coherently ordered on the coherent interconnect to the memory system. In a bus based system, a successful transfer of the address phase on the bus may make a write globally visible.

The flags register 72 may store the flags described above with regard to FIG. 1. The Tx control circuit 56, in response to a control descriptor that updates on the flags, communicates the update to the data flow control circuit 70. The data flow control circuit 70 may modify the identified flag or flags. Similarly, in response to a control descriptor that waits on a value of a flag, the Tx control circuit 56 may communicate the wait to the data flow control circuit 70. The data flow control circuit 70 may release the Tx control circuit 56 for the channel in which the wait was detected when the value indicated by the control descriptor is found in the flags register 72.

In one embodiment, the flags register 72 is software accessible. That is, instructions executing on the processors 18A-18B may read and/or write the contents of the flags register 72. Software may thus initialize flags in the register 72, and may also determine the contents of the flags register 72. Software accessibility may also aid in error handling. If a source DMA transfer ends in an error, the control descriptor that updates the flag that is being waited on may not occur. This could leave a channel hung waiting on the flag value. If error handling software detects that an update to a flag is being waited on, it may update the flag to release the hung channel.

In one embodiment, each flag is a bit having a set and clear state. Updates to either the set or clear state may be performed using control descriptors, and either the set or clear state may be waited on by a control descriptor. In other embodiments, one state may be the initial value and the other state may be the value to which the control descriptor updates the flag. For example, the clear state may be the initial value and the set state may be the updated value, or vice versa. In still other embodiments, a flag may be a multibit value and any value of the flag may be specified to be waited on. Any number of flags may be supported.

A loopback circuit 40 may provide the link between the Tx DMA data path and the Rx DMA data path. That is, a "loopback circuit" comprises circuitry local to the DMA controller that is coupled to receive Tx DMA data from a transmit DMA data path and to provide Rx DMA data on a receive DMA data path. The data provided by the loopback circuit 40 on the receive DMA data path may be the data received from the transmit DMA data path (e.g. for the copy DMA function). In some embodiments, the data provided by the loopback circuit 40 may be data transformed by the loopback circuit 40 from the received data. In some embodiments, the data provided by the loopback circuit 40 may be the data received by the loopback circuit 40, augmented by a result calculated by the loopback circuit 40 on the data (e.g. checksum, CRC data, etc.). Alternatively, the data provided by the loopback circuit 40 may be the data received by the loopback circuit 40 (or the data may not be provided), and the result may be stored in the descriptor for the DMA transfer. Either the transformed data or the result calculated and included with the data or written to the DMA descriptor may generically be referred to herein as the "result".

Thus, in some embodiments, the loopback circuit 40 may be configured to perform one or more operations (or "functions") on the Tx DMA data to produce a result (e.g. transformed DMA data, or a result generated from the data). In the embodiment of FIG. 2, the loopback circuit 40 may include a copy FIFO 42, an offload engine 44, and an exclusive OR (XOR) circuit 46 coupled to the transmit data path. The copy FIFO 42 may store transmit data from the Tx DMA data path for transmission on the Rx DMA data path. Accordingly, the copy FIFO 42 may perform the copy DMA operation. The offload engine 44 may be configured to perform various operations on the DMA data, producing either transformed data or a result separate from the data. The offload engine 44 may be configured to provide any desired set of operations, in various embodiments. In one embodiment, the offload engine 44 may be configured to perform operations that aid in packet processing. For example, various network security protocols have been developed that provide for encryption and/or authentication of packets. Authentication typically includes generating a hash over some or all of the packet. So, the offload engine 44 may be configured to perform encryption/decryption and/or hash functions on packet data in a DMA transfer. Additionally, the offload engine 44 may be configured to perform checksum generation/checking and/or CRC generation/checking. Checksum and/or CRC protection are used in various packet protocols. The XOR circuit 46 may bitwise-XOR DMA data (e.g. DMA data from multiple sources). The XOR circuit 46 may be used, e.g., to support redundant arrays of inexpensive disks (RAID) processing and other types or processing that use XOR functions.

The loopback circuit 40 (and more particularly, the loopback components 42, 44, and 46) may operate on the DMA data during the DMA transfer that provides the DMA data to the loopback circuit 40. That is, the loopback circuit 40 may at least start performing the operation on the DMA data while the Tx DMA transfer provides the remainder of the DMA data. Generally, the result may be written to memory, or more generally to the host address space (e.g. as transformed DMA data, appended to the DMA data, or to a separate result memory location such as a field in the DMA descriptor for the Tx DMA transfer).

The loopback circuit 40 may also include FIFOs for the offload engine 44 and the XOR circuit 46 (offload FIFO 48 coupled to the offload engine 44 and XOR FIFO 50 coupled to the XOR circuit 46). The FIFOs 48 and 50 may temporarily store data from the offload engine 44 and the XOR circuit 46, respectively, until the DMA data may be transmitted on the receive DMA data path. An arbiter 52 is provided in the illustrated embodiment, coupled to the FIFOs 42, 48, and 50, to arbitrate between the FIFOs. The arbiter 52 is also coupled to a loopback FIFO 54, which may temporarily store data from the loopback circuit 40 to be written to the target.

The Tx control circuit 56 transmits DMA data to the target. The target, in this embodiment, may be either one of the interface circuits 16 or the loopback circuit 40 (and more particularly, one of the copy FIFO 42, the offload engine 44, and the XOR circuit 46 in the illustrated embodiment). The Tx control circuit 56 may identify the target for transmitted data (e.g. by transmitting a target identifier). Alternatively, physically separate paths may be provided between the Tx control circuit 56 and the interface circuits 16 and between the Tx control circuit 56 and loopback components 42, 44, and 46. The Tx control circuit 56 may include a set of buffers 62 to temporarily store data to be transmitted. The Tx control circuit 56 may also provide various control information with the data. The control information may include information from the DMA descriptor. The control information may include, for the loopback circuit 40, the buffer pointer (or pointers) for storing data in the target address space. The control information may also include any other control information that may be included in the DMA descriptor and may be used by the interface circuits 16 or the loopback circuit 14. Examples will be provided in more detail below with respect to the DMA descriptor discussion.

The Rx control circuit 58 may receive DMA data to be written to the host 12 address space, and may generate writes to store the data to memory. In one embodiment, software may allocate buffers in memory to store received DMA data. The Rx control circuit 58 may be provided with buffer pointers (addresses in the host address space identifying the buffers). The Rx control circuit 58 may use the buffer pointer to generate the addresses for the writes to store the data. An Rx prefetch engine 60 may be provided to prefetch the buffer pointers for the Rx control circuit 58. The Rx prefetch engine 60 is coupled to provide the buffer pointers to the Rx control circuit 58. The Rx prefetch engine 60 may include a set of buffers 64 to temporarily store prefetched buffer pointers for use by the Rx prefetch engine 60. Similarly, the Rx control circuit 58 may include a set of buffers 68 to temporarily store received DMA data to be written to memory.

In one embodiment, the Rx control circuit 58 may be configured to generate descriptors for received DMA data. That is, rather than having software create DMA descriptors for received DMA data, software may allocate buffers to store the DMA data and may provide the buffer pointers. The Rx control circuit 58 may store received DMA data in the allocated buffers, and may create the descriptors for the DMA transfers. The descriptors created by the Rx control circuit 58 may include one or more buffer pointers to one or more buffers storing the received DMA data, as well as other information describing the DMA transfer. Since the Rx control circuit 58 creates the descriptors for received DMA data, the descriptors may be more efficient than those created by software. For example, software may have to create receive DMA descriptors capable of receiving the largest possible DMA transfer (or multiple descriptors may be required for larger transfers), and may have to allocate enough buffers for storing the largest possible DMA transfer. On the other hand, descriptors created by the Rx control circuit 58 may be large enough for the actual transfer received (and may consume enough buffers to store the received data), but not necessarily larger.

In the illustrated embodiment, the Rx control circuit 58 may receive the DMA data from an arbiter 66, which is coupled to the loopback FIFO 54 and to receive DMA data from the interface circuits 16 as well. The arbiter 66 may arbitrate between the loopback FIFO 54 and the received DMA data from the interface circuits 16 to transfer data to the Rx control circuit 58.

The arbiters 52 and 66 may implement any desired arbitration scheme. For example, a priority-based scheme, a round-robin scheme, a weighted round-robin scheme, or combinations of such schemes may be used. In some embodiments, the arbitration scheme may be programmable. The arbitration scheme(s) implemented by the arbiter 52 may differ from the scheme(s) implemented by the arbiter 66.

The Tx control circuit 56, the Rx prefetch engine 60, and the Rx control circuit 58 are coupled to an IOM/IOB interface unit 70 in the illustrated embodiment. The IOM/IOB interface unit 56 may communicate with the IOB 22 and the IOM 24 on behalf of the Tx control circuit 56, the Rx prefetch engine 60, and the Rx control circuit 58. The IOM/IOB interface unit 70 may receive read and write requests from the Tx control circuit 56, the Rx prefetch engine 60, and the Rx control circuit 58 and may communicate with the IOB 22 and the IOM 24 to satisfy those requests.

Particularly, the IOM/IOB interface unit 70 may receive read requests for descriptors and for DMA data from the Tx control circuit 56 and read requests to the memory storing buffer pointers from the Rx prefetch engine 60, and may convey the requests to the IOB 22. The IOB 22 may indicate which IOM 24 entry stores a cache line of data including the requested data (subsequent to reading the data from the host address space or the IOC 26, for example, or the data may already be in the IOM 24 from a previous request), and the IOM/IOB interface 70 may read the data from the IOM 24 and provide it to the Tx control circuit 56 or the Rx prefetch engine 60. The IOM/IOB interface unit 70 may also receive write requests from the Rx control circuit 58, and may store the write data in the IOM 24 (at an entry allocated for the write data by the IOB 22). Once a cache line of data is accumulated in the IOM 24 (or the DMA transfer completes, whichever comes first), the IOM/IOB interface unit 70 may inform the IOB 22 and may provide an address to which the cache line is to be written (derived from the buffer pointer to the buffer being written).

It is noted that, while the Tx control circuit 56 implements prefetch to obtain descriptors and DMA data, other embodiments may not implement prefetch. Thus, in general, there may be a Tx engine 56 or Tx control circuit 56 configured to perform transmit DMA transfers (and DMA transfers to the loopback circuit 40).

It is noted that, while the data flow control circuit 70 is shown separate from the Tx control circuit 56 in FIG. 2 for ease of illustration, it may be the case in practice that the circuitry implementing the data flow control circuit 70 and the circuitry implementing the Tx control circuit 56 may be intermingled. That is, the illustration of FIG. 2 is not necessarily meant to indicate physical separation of circuitry. Other illustrations herein may be similar.

It is noted that the present description refers to buffers and buffer pointers for DMA transfers. A buffer that is pointed to by a buffer pointer (as opposed to hardware storage buffers such as 62, 64, and 68) may comprise a contiguous memory region. Software may allocate the memory region to store DMA data (either for transmission or as a region to receive DMA data). The buffer pointer may comprise an address of the memory region in the host address space. For example, the buffer pointer may point to the base of the memory region or the limit of the memory region.

Figure 3:
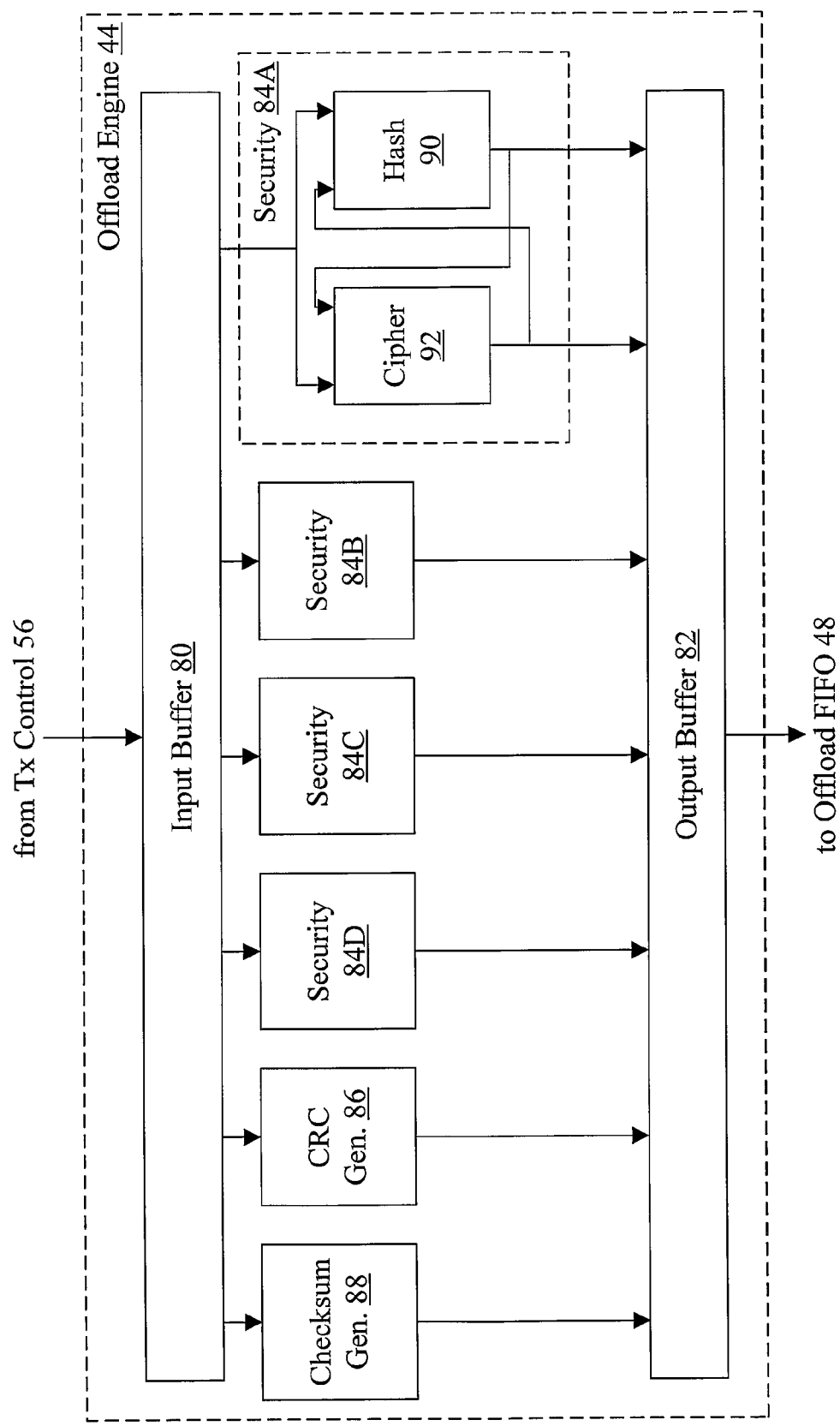
FIG. 3 is a block diagram of one embodiment of an offload engine shown in FIG. 2.

Turning now to FIG. 3, a block diagram of one embodiment of the offload engine 44 is shown. In the illustrated embodiment, the offload engine 44 includes an input buffer 80, an output buffer 82, a set of security circuits 84A-84D, a CRC generator 86, and a checksum generator 88. The input buffer 80 is coupled to the Tx control circuit 56 and to the security circuits 84A-84D, the CRC generator 86, and the checksum generator 88. The output buffer 82 is coupled to the security circuits 84A-84D, the CRC generator 86, and the checksum generator 88. The output buffer 82 is coupled to the offload FIFO 48 as well. The security circuit 84A is shown in greater detail in FIG. 3 for one embodiment, and the security circuits 84B-84D may be similar. The security circuit 84A includes a hash circuit 90 and a cipher circuit 92. The hash circuit 90 and the cipher circuit 92 are both coupled to the input buffer 80 and the output buffer 82. Additionally, the output of the hash circuit 90 is coupled as an input to the cipher circuit 92 and the output of the cipher circuit 92 is coupled as an input to the hash circuit 90 in a "butterfly" configuration.

The security circuits 84A-84D may be configured to perform various operations to offload security functions of packet processing. Particularly, the security circuits 84A-84D may be configured to perform encryption/decryption (collectively referred to as ciphering, or cipher functions) and hashing functions that are included in various secure packet specifications (e.g. the secure internet protocol (IPSec) or secure sockets layer (SSL)).

Typically, communicating using a secure packet protocol includes a negotiation session in which the endpoints communicate the protocols that they can use, the security schemes that the support, type of encryption and hash, exchange of keys or certificates, etc. Then there is a bulk transfer phase using the agreed-upon protocols, encryption, etc. During the bulk transfer, packets may be received into the host 12 (e.g. via the receive DMA path from one of the interface circuits 16). Software may consult data structures in memory to obtain the keys, encryption algorithms, etc., and prepare a DMA transfer through the offload engine 44 to decrypt and/or authenticate the packet. Similarly, software may prepare a packet for secure transmission and use a DMA transfer through the offload engine 44 to encrypt and/or authenticate the packet.

The hash circuit 90 may implement various hash functions that may be used in authentication of packets. Typically, the hash is computed over at least a portion of the packet, and the hash result is included in the packet. When the packet is received at its destination, the hash may be checked to detect if any fields in the packet have been changed (and thus detect if the packet was modified in transit from its source). In one embodiment, the following hash functions may be supported in the hash circuit 90: Message Digest 5 (MD-5)/secure hash algorithm-1 (SHA-1), and hashed message authentication code (HMAC). Other embodiments may implement SHA-2. Other embodiments may implement any other set of hash functions, including subsets or supersets of the above functions and other functions.

The cipher circuit 92 may be configured to perform cipher functions. Depending on the secure packet specification, the cipher function may be applied to at least a portion of the packet, possibly including the hash data. Any set of cipher functions may be supported in various embodiments. For example, in one embodiment, the following encryption/decryption algorithms may be implemented in the cipher circuit 92: data encryption standard (DES), triple data encryption standard (3DES), advanced encryption standard (AES), Kasumi, alleged Ron's code 4 (ARC4) and/or Ron's code 4 (RC4).

In some cases, if both authentication and cipher functions are being used, the encryption is performed first when preparing a packet for transmission, and then authentication hashing is performed over the encrypted data (e.g. IPSec). In other cases, the authentication hash is performed first, and encryption of the packet (including the hash data) is performed second (e.g. SSL). In either case, the authentication hash and decryption are performed in the opposite order on a received packet.

The security circuits 84A-84D may support either order of ciphering and hashing of data in a single DMA transfer, via the butterfly connection between the circuits 90 and 92. That is, if ciphering is to be performed first, the data provided to the security circuit 84A may be routed to the cipher circuit 92, and the output of the cipher circuit 92 may be routed to the input of the hash circuit 90 to compute the hash function on the encrypted (or decrypted) data. If hashing is to be performed first, the data provided to the security circuit 84A may be routed to the hash circuit 90, and the output of the hash circuit 90 may be routed to the input of the cipher circuit 92. The security circuits 84A-84D also support performing only the hash or only the cipher function in a given DMA transfer. Control information from the DMA descriptor for the DMA transfer directed to the security circuits 84A-84D may control the routing of data through the security circuits 84A-84D.

The illustrated embodiment shows 4 security circuits 84A-84D. Other embodiments may include any number of security circuits, including one security circuit. In one embodiment, the security circuits 84A-84D may be clocked at double the frequency of the system clock used in the system 10 and may receive two operations per system clock cycle (one performed in the first half of the system clock cycle and the other in the second half of the system clock cycle). Thus, there may be 8 logical security circuits that may be selected by software to perform security functions.

The CRC generator 86 may be configured to generate CRC data over the data provided in a DMA transfer specifying CRC generation. The CRC generation may also be used to check CRC data from a received packet. For example, the CRC data generated in the CRC generator 86 may be compared to the corresponding CRC data in the received packet. Alternatively, the CRC data in the received packet may be included in the DMA transfer through the CRC generator 86, and the result may be checked against a predetermined value to detect error in the received packet. In some embodiments, there may be more than one CRC generator 86. Furthermore, the CRC generator(s) 86 may be clocked at twice the system clock frequency, similar to the security circuits 84A-84D, to provide more logical CRC generators than are physically provided in the offload engine 44. In one particular embodiment, there may be 4 of the CRC generators 86, clocked at twice the system clock frequency, to provide an equal number of logical units (8) to the security circuits 84A-84D.

The checksum generator 88 may be configured to generate a checksum over the data provided in a DMA transfer that specifies checksum generation. The checksum generation may also be used to check the checksum data from a received packet. For example, the checksum data generated in the checksum generator 88 may be compared to the corresponding checksum in the received packet. Alternatively, the checksum data in the received packet may be included in the DMA transfer through the checksum generator 88, and the result may be checked against a predetermined value to detect error in the received packet. In some embodiments, there may be more than one checksum generator 88.

The input buffer 80 may temporarily store data provided by the Tx control circuit 56 until the target circuit 84A-84D, 86, or 88 may operate upon the data. The circuits 84A-84D, 86, and 88 may output data to the output buffer 82 to be written to the offload FIFO 48. In other embodiments, the input buffer 80 and/or the output buffer 82 may not be included.

Figure 4:
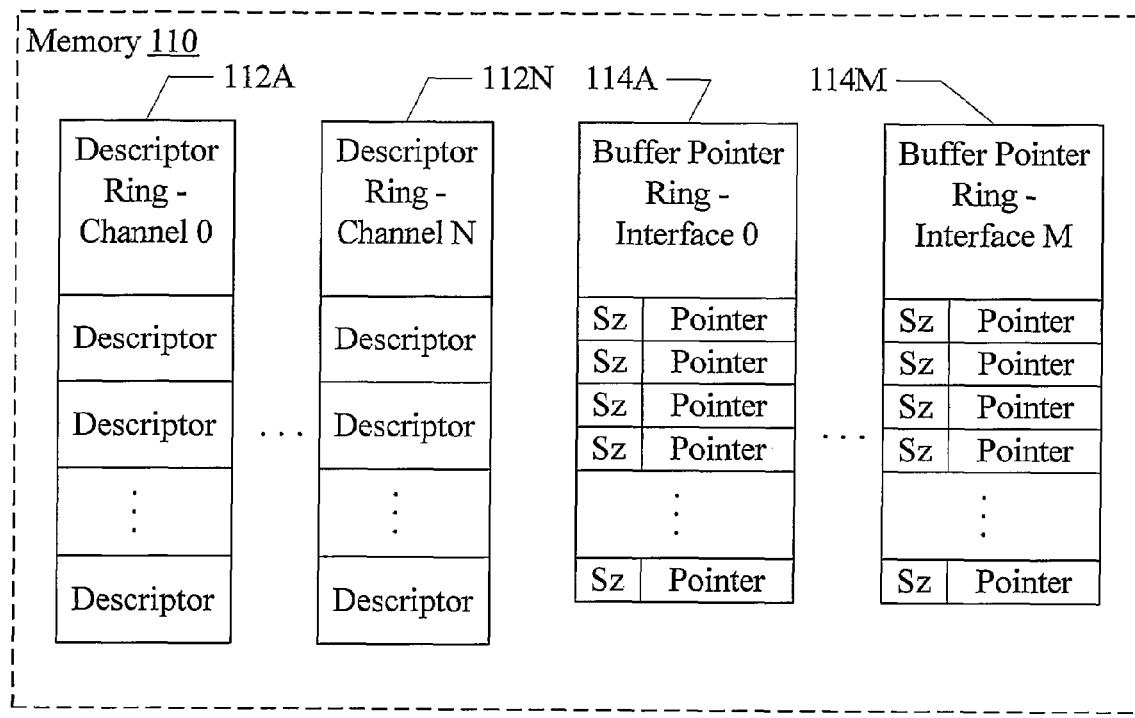
FIG. 4 is a block diagram of one embodiment of descriptor rings and buffer pointer rings.

Turning next to FIG. 4, a block diagram of a memory region 110 storing descriptor data structures and buffer pointer data structures is shown. In the embodiment of FIG. 4, the descriptor data structures include a set of descriptor rings 112A-112N. There may be one descriptor ring for each DMA channel supported by the DMA controller 14 (e.g. channel 0 to channel N in FIG. 4). That is, there may be a one-to-one correspondence between DMA channels and descriptor rings, and the DMA transfers for a given DMA channel may have corresponding descriptors in the descriptor ring 112A-112N assigned to that channel. If a DMA channel is disabled or otherwise not in use, there may not be a descriptor ring for the channel until the channel is enabled/used. Additionally, in the embodiment of FIG. 4, the buffer pointer data structures may including a set of buffer pointer rings 114A-114M. There may be a buffer pointer ring per interface circuit 16 (e.g. interface circuits 0 to M in FIG. 4, where M+1 may be the number of interface circuits 16). That is, there may be a one-to-one correspondence between interface circuits and descriptor rings, and the buffer pointers used for DMA's received on that interface may be taken from the buffer pointer ring 114A-114M assigned to that interface circuit. In an interface is disabled or otherwise not in use, there may not be a buffer pointer ring for that interface at that time.

Each descriptor ring 112A-112N may comprise a set of descriptors for the corresponding DMA channel. For transmit DMA channels, the descriptors may be processed in the order included within the ring, from the first descriptor in the ring to the last, and then wrapping around to the first descriptor in the ring after the last descriptor has been processed. Thus, at a given point in time, any descriptor in the ring may be viewed as the "current descriptor" that is the next to be processed. Software may control the number of descriptors that are available for processing on the DMA channel in a variety of fashions, as mentioned above. Accordingly, if there are descriptors available on a given transmit DMA channel (in the corresponding descriptor ring), the DMA controller 14 may perform the specified DMA transfers (arbitrating for resources with other DMA channels). For receive DMA channels in the present embodiment, the descriptors in the corresponding descriptor ring may be consumed as DMA transfers are received on that channel. The DMA controller 14 may write the current descriptor with the buffer pointer(s) used to store the received DMA data, as well as other information related to the DMA transfer such as transfer status information.

Other embodiments may use other data structures (e.g. linked lists of descriptors). The base address of each descriptor ring 112A-112N may be provided to the DMA controller 14. Other attributes of the descriptor ring 112A-112N may be programmed as well (e.g. extent). In some embodiments, the descriptors in a given ring may be of a fixed size, so that a given descriptor may be at a fixed offset from the base address of the ring. In other embodiments, descriptors may be variable in size, or programmably selected as fixed or variable (e.g. on a channel by channel basis). While the processing of descriptors in a given ring may generally be attempted in order, various implementations may prefetch from the ring and/or the DMA memory buffers, overlap processing of descriptors, and/or process two or more descriptors in parallel.

Each buffer pointer ring 114A-114M comprises buffer pointers pointing to buffers in memory allocated by software for use to store DMA data from Rx DMA transfers from the corresponding interface. Similar to the descriptor rings 112A-112N, software may make the buffer pointers in the buffer pointer rings 114A-114M available to the DMA controller 14 in any desired fashion. The base address of the buffer pointer ring for each interface may be programmed into the DMA controller 14, and at any given time, one of the buffer pointers in the buffer pointer ring may be the next to be consumed for the corresponding interface.

By providing the buffer pointer rings 114A-114M associated with the interface circuits, rather than the DMA channels, the software may allocate buffers to the smaller number of interface circuits rather than the larger number of DMA channels, in some embodiments. The allocation of memory may, in some cases, be more efficient. Interface circuits that are handling more traffic may be allocated more buffers, without software having prior knowledge of what channels that traffic will be received on. As DMA data is received from a given interface, the data may be stored in the buffers allocated to that interface and the buffer pointers may be written to the descriptor for the channel on which the DMA data is received. The descriptor may be in one of the descriptor rings 112A-112N, depending upon which receive DMA channel is associated with the DMA transfer.

The buffer pointer rings 114A-114M may also include a size field (Sz in FIG. 4) for each buffer pointer. The size field may indicate the size of the buffer pointed at by the corresponding buffer pointer. Accordingly, software may allocate buffers of different sizes based on, e.g., the amount of memory available, the expected size of DMA transfers on a given interface, etc.

Figure 5:
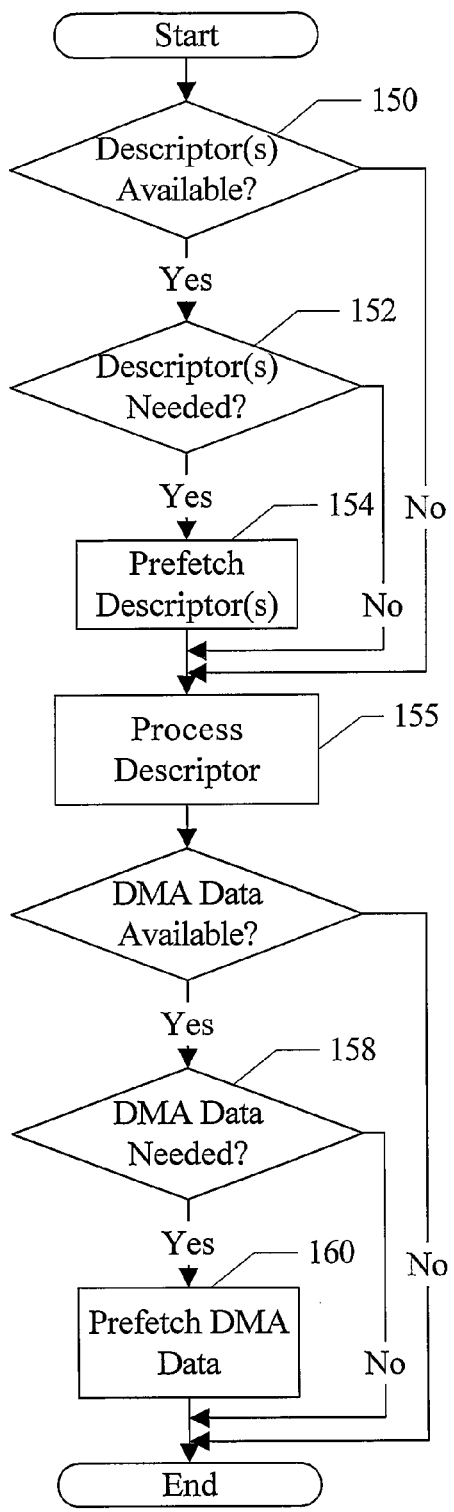
FIG. 5 is a flowchart illustrating prefetch operation of one embodiment of a transmit control circuit shown in FIG. 2.

Turning next to FIG. 5, a flowchart is shown illustrating operation of one embodiment of the Tx control circuit 56 and the data flow control circuit 70 for a given Tx DMA channel. The Tx control circuit 56 and/or the data flow control circuit 70 may include circuitry that implements the operation shown in FIG. 5 for each Tx DMA channel, operating in parallel and independently. While blocks are shown in a particular order in FIG. 5 for ease of understanding, the blocks may be implemented in parallel in combinatorial logic circuitry that implements the operation shown in FIG. 5. In some embodiments, one or more of the blocks or the flowchart as a whole may be pipelined over multiple clock cycles.

The Tx control circuit 56 may determine if descriptors are available for the channel for prefetch (in the descriptor ring 112A-112N corresponding to the channel) (decision block 150), and if descriptors are needed for the channel (decision block 152). If at least one descriptor is available and needed (decision blocks 150 and 152, "yes" leg), the Tx control circuit 56 may generate a request to read the descriptors from the descriptor ring 112A-112N in the host 12's memory (block 154). It is noted that, if descriptors are prefetched and a previous descriptor includes the serialize indication indicating serialization or is a control descriptor indicating a wait on a flag, the prefetches may be discarded and prefetching may be inhibited until the Tx control circuit 56 is released for that channel.

Descriptors may generally be "available" if there are descriptors in the corresponding descriptor ring 112A-112N that have not been prefetched by the Tx control circuit 56. The descriptors for a Tx DMA channel may be inserted into the descriptor ring 112A-112N by software, and software may indicate that they are available in any of the previously mentioned fashions (e.g. using valid bits in the descriptor ring entries, incrementing a descriptor ring count, etc.). Descriptors may be viewed as "needed" in a variety of fashions as well. For example, if a Tx DMA channel is enabled, there are no descriptors prefetched for the channel, and the channel is not stalled awaiting a serialization or flag value, a descriptor may be "needed". In some embodiments, the Tx control circuit 56 may prefetch descriptors as along as there is room in the IOM 24 and/or the buffers 62 to store the descriptors. In other embodiments, the Tx control circuit 56 may be programmable to indicate a number of descriptors that should be prefetched, or a minimum and maximum number of descriptors that should be prefetched. The Tx control circuit 56 may generate prefetch requests for descriptors to attempt to prefetch the programmed number of descriptors.

The Tx control circuit 56 may be informed by the IOM/IOB interface circuit 70 when prefetched descriptors are available in the IOM 24 to be read. The Tx control circuit 56 may, in some embodiments, read some or all of the descriptors from the IOM 24 into the buffers 62.

Figure 6:
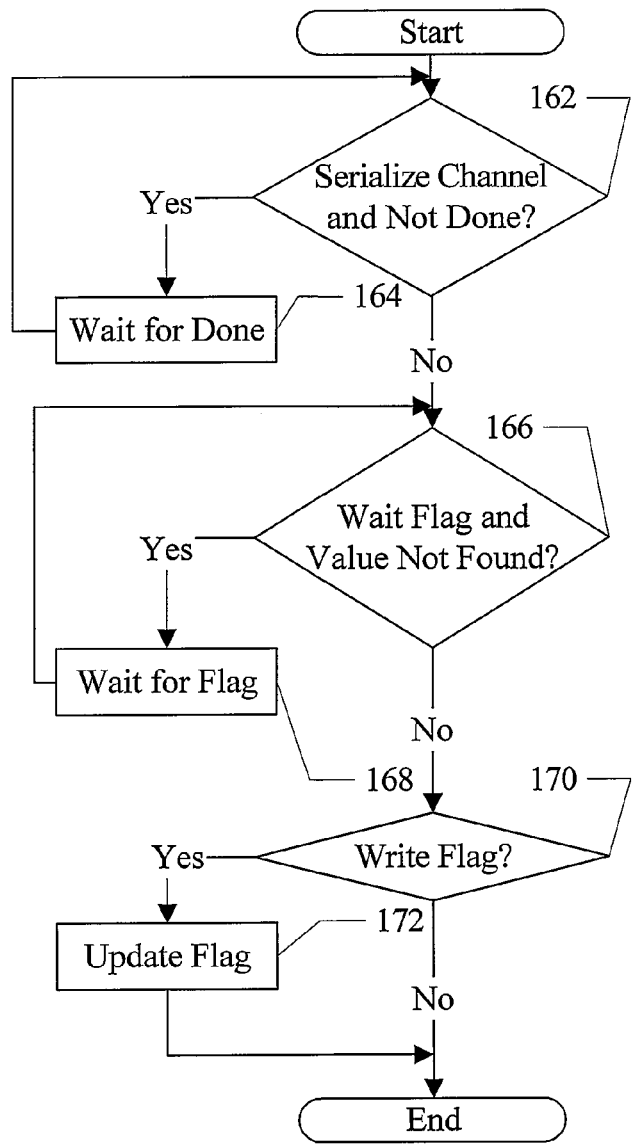
FIG. 6 is a flowchart illustrating data flow control of one embodiment of a transmit control circuit shown in FIG. 2.

The Tx control circuit 56 may process the current descriptor for the channel (block 155). Processing the current descriptor may including handling control descriptors to write a flag or wait on a flag value, as well as handling the serialization within the channel. For example, FIG. 6 is a flowchart illustrating block 155 in more detail. The Tx control circuit 56 and/or the data flow control circuit 70 may include circuitry that implements the operation shown in FIG. 6 for each Tx DMA channel, operating in parallel and independently. While blocks are shown in a particular order in FIG. 6 for ease of understanding, the blocks may be implemented in parallel in combinatorial logic circuitry that implements the operation shown in FIG. 6. In some embodiments, one or more of the blocks or the flowchart as a whole may be pipelined over multiple clock cycles.

In FIG. 6, if the current descriptor includes a serialization indication and the done indication from the Rx control circuit 58 has not yet been received for the channel (decision block 162, "yes" leg), the Tx control circuit 56 may wait for a release from the data flow control circuit 70 (in response to the done indication) (block 164). If the descriptor is a control descriptor specifying a wait for a value in a flag and the value has not been found yet (decision block 164, "yes" leg), the Tx control circuit 56 may communicate the wait to the data flow control circuit 70 and wait for a release from the data flow control circuit 70 (in response to the flag having the specified value) (block 168). If the descriptor is a control descriptor specifying a flag update (decision block 170, "yes" leg), the Tx control circuit 56 may transmit the update to the data flow control circuit, which may update the flag (block 172).

Returning to FIG. 5, the Tx control circuit 56 may determine if DMA data is available for the channel for prefetch (to be transmitted on the channel) (decision block 156), and if DMA data is needed for the channel (decision block 158). If DMA data is available and needed (decision blocks 156 and 158, "yes" leg), the Tx control circuit 56 may generate a request to read the DMA data from the host 12's address space (e.g. from memory locations in the host 12) (block 160).

DMA data may be regarded as available for prefetch if the Tx control circuit 56 has a descriptor to be processed (e.g. the descriptor is the next one to be processed from the descriptor ring for the channel), the descriptor data is in the buffers 62 or the IOM 24, and the descriptor data describes a valid DMA transfer to be performed. DMA data may be needed if previous DMA data on the channel has been transmitted (or will be transmitted soon). In some embodiments, the Tx control circuit 56 may be programmable with how much DMA data is to be prefetched at any given time, and DMA data may be needed if less than the desired amount of DMA data has been prefetched and not yet transmitted. In some embodiments, the arbitration scheme among the transmit channels may also affect if DMA data is needed (e.g. if the channel will not win arbitration for a relatively large amount of time, DMA data may not yet be needed since it may not be transmitted until it wins arbitration).

It is noted that the operation illustrated by blocks 156, 158, and 160 may be independent of the operation of blocks 150, 152, and 154 (other than that the prefetched descriptors are used to determine if DMA data is available). Accordingly, circuitry that implements blocks 156, 158, and 160 may be independent of the circuitry that implements blocks 150, 152, and 154 and may evaluate in parallel with such circuitry.

As mentioned above, the operation of FIG. 5 may be performed in parallel for each enabled Tx DMA channel. If more than one prefetch request is generated concurrently, the Tx control circuit 56 may also include circuitry to select among the prefetch requests. For example, the Tx control circuit 56 may select the prefetch request corresponding to Tx DMA channel for which the fewest descriptors or smallest amount of DMA data are currently prefetched and ready. As another example, the Tx control circuit 56 may weight the requests based on which Tx DMA channel has the largest difference between the currently prefetched descriptors/DMA data and the desired number of descriptors/amount of DMA data for that channel. Round-robin or priority based selection mechanisms may also be used, and these schemes may include programmable weighting among the channels, if desired. Starvation prevention mechanisms such as per-channel timeouts may also be used to ensure that descriptors and DMA data are prefetched for each enabled channel.

The Tx control circuit 56 may be informed by the IOM/IOB interface circuit 70 when prefetched DMA data is available in the IOM 24 to be read. The Tx control circuit 56 may, in some embodiments, read some or all of the DMA data from the IOM 24 into the buffers 62. Additionally, the Tx control circuit 56 may transmit the prefetched DMA data to the target.

FIGS. 7-10 illustrate examples of descriptors of various types according to one embodiment of the DMA controller 14. Generally, the descriptors comprise a header, optionally a data field to store a result (e.g. a result generated by the loopback circuit 40), and one or more buffer pointers that point to buffers storing DMA data (source buffer pointers) or to buffers that may be used to store DMA data (destination buffer pointers).

In the present embodiment, descriptors vary based on whether they are receive or transmit DMAs, or the function to be performed by the loopback circuit 40, if selected. Receive descriptors are used for Rx DMA transfers, and other types of descriptors are used by the Tx DMA transfers and loopback functions. The DMA controller 14 (and more particularly the Tx control circuit 56, in one embodiment) may determine the format of the descriptors in a descriptor ring for a given Tx DMA channel based on the assignment of that channel to the interface circuits 16 or to a function in the loopback circuit 40.

In FIGS. 7-10, various fields are illustrated in detail (e.g. the header field in particular). While certain information is shown in FIGS. 7-10, it is not intended to preclude the use of other information in addition to that illustrated, or in addition to a subset of that illustrated, or as an alternative to that illustrated. Various additional information may be included, in various implementations, as desired.

Figure 7:
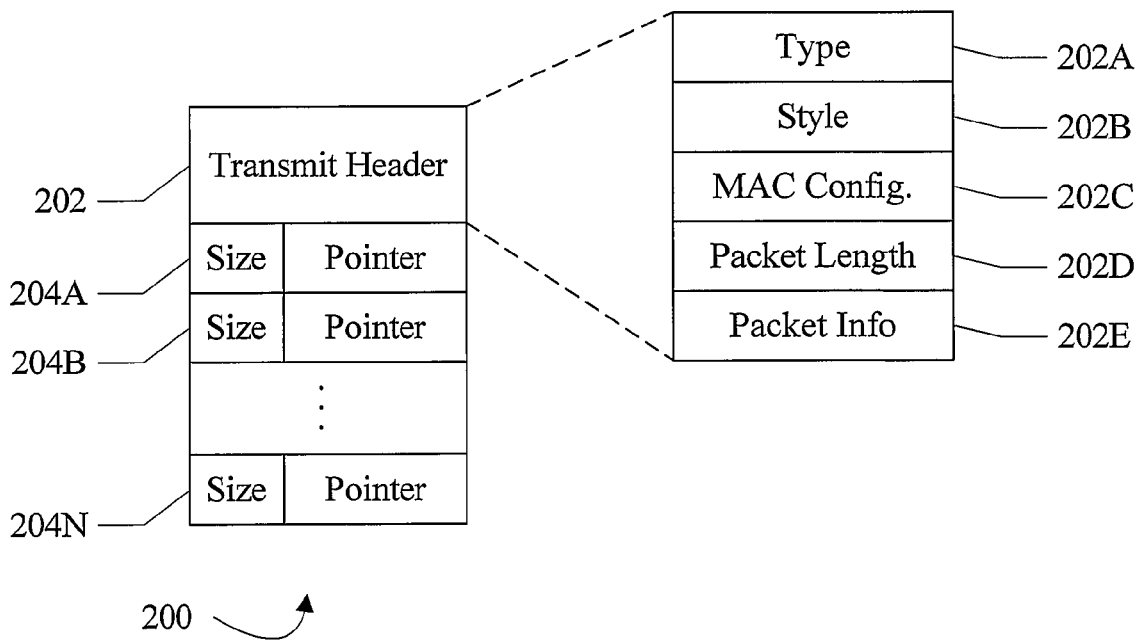
FIG. 7 is a block diagram illustrating one embodiment of a transmit DMA descriptor.

FIG. 7 is a block diagram of one embodiment of a transmit descriptor 200. The transmit descriptor 200 may be the format of descriptors used by the Tx control circuit 56 for Tx DMA transfers to interface circuits 16, particularly to MACs 34A-34B, and may be written by software to the descriptor rings 112A-112N that correspond to Tx DMA channels assigned to the interface circuits 16. In the embodiment of FIG. 7, the transmit descriptor 200 includes a header field 202 (illustrated in exploded view in FIG. 7 for one embodiment) and one or more buffer pointer fields 204A-204N. Each buffer pointer field 204A-204N includes a size field that may be encoded with the size of the buffer and a pointer field encoded with the pointer to the buffer. The Tx control circuit 56 may be configured to read the buffer pointer fields 204A-204N to prefetch the DMA data from the buffers for transmission.

The exploded view of the transmit header field 202 includes a type field 202A, a style field 202B, a MAC configuration field 202C, a packet length field 202D, and a packet info field 202E. The type field 202A may encode the descriptor type, e.g. control descriptor or transfer descriptor. The type field 202A (and other similar type fields described below for other descriptors) may identify the descriptor as a transfer descriptor except for the control descriptor shown in FIG. 8. The style field 202B may encode the style of the descriptor, which refers to whether the buffer pointers in the buffer pointer fields 204A-204N include both source and destination pointers or only source pointers. The MAC configuration field 202C may be encoded with various packet-specific MAC configuration information for the MAC 34A-34B that is targeted by the DMA transfer. For example, the MAC configuration field 202C may include virtual local area network (VLAN) configuration (e.g. none, insert, remove, or modify), CRC configuration (e.g. none, insert CRC, pad CRC, modify CRC), and whether to modify the MAC source address. The packet length field 202D may be encoded with the length of the packet stored in the buffers (e.g. in bytes). The packet info field 202E may be encoded with various information describing the packet (e.g. IP header length, Ethernet header length, type of packet (TCP/UDP), checksum enable, etc.).

In this embodiment, the transmit descriptor 200 does not include a serialize indication to permit serialization. Other embodiments may include the serialize indication. In the case of serialization of the transmit descriptor 200, the DMA transfer may be considered complete when the last DMA data of the transfer are transmitted to the destination interface circuit.

Figure 8:
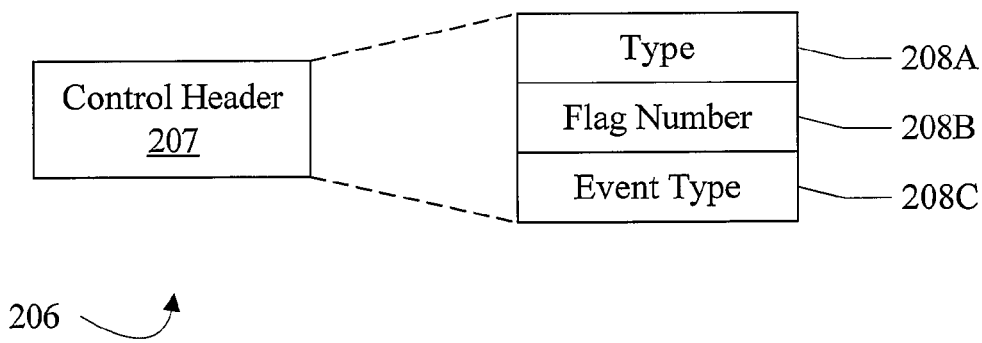
FIG. 8 is a block diagram illustrating one embodiment of a control descriptor.

FIG. 8 is a block diagram of one embodiment of a control descriptor 206. The control descriptor 206 may be the format of control descriptors used by the Tx control circuit 56 in any DMA channel. Specifically, the control descriptor 206 may be used for the flag wait and flag update descriptors for the flags in the flags register 72. In the embodiment of FIG. 8, the control descriptor 230 includes a header field 207 (illustrated in exploded view in FIG. 8 for one embodiment) with no data field.

The exploded view of the control header field 207 includes a type field 208A, a flag number field 208B, and an event type field 208C. The type field 208A may be similar to the type field 202A described above, identifying the descriptor 206 as a control descriptor. The flag number field 208B may specify which flag to update (that is, the position of the flag within the flags register 72). The event type field 208C may indication which type of control descriptor is being provided. The encodings of the event type field 208C may include wait for flag=0; wait for flag=1; write flag to 0; and write flag to 1. For each of those encodings, the flag is the one specified in the flag number field 208B. In one embodiment, the event type field 208C may also include a "wait for external" encoding. The wait for external encoding may wait for an external signal to be asserted before releasing the Tx control circuit 56 for the channel.

In embodiments in which a flag is a multibit value, the event type field may list the value that is being waited on or written, or each possible value my be encoded.

Figure 9:
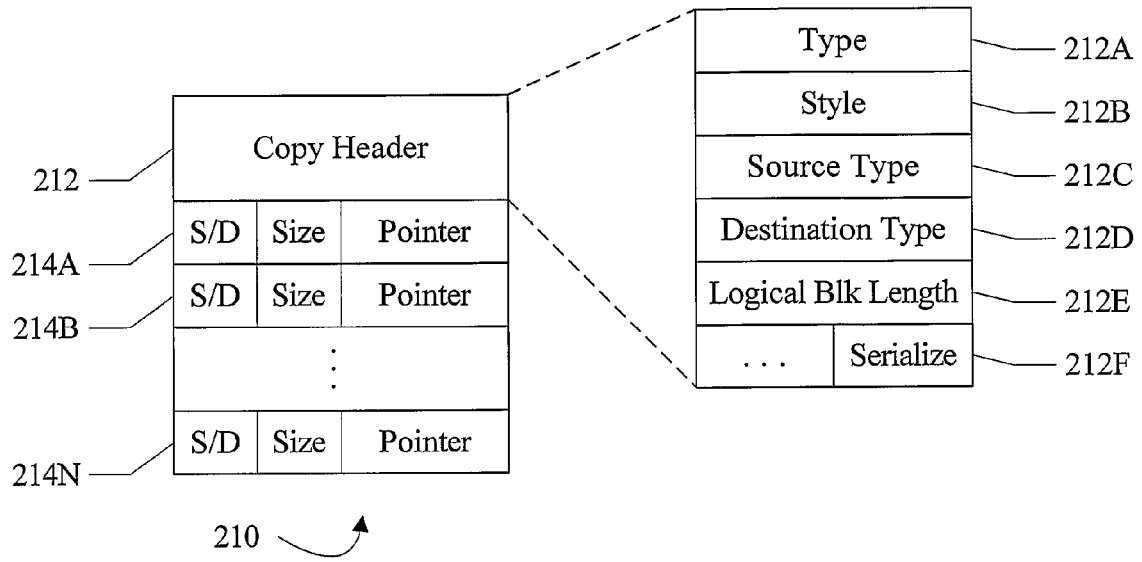
FIG. 9 is a block diagram illustrating one embodiment of a copy DMA descriptor.

FIG. 9 is a block diagram of one embodiment of a copy descriptor 210. The copy descriptor 210 may be the format of descriptors used by the Tx control circuit 56 for copy DMA transfers (from one memory region in the host 12 to another memory region in the host 12) using the copy FIFO 42. Thus, the copy descriptor 210 may be used in the descriptor rings 112A-112N that correspond to Tx DMA channels assigned to the copy FIFO 42. In the embodiment of FIG. 9, the copy descriptor 210 includes a header field 212 (illustrated in exploded view in FIG. 9 for one embodiment) and one or more buffer pointer fields 214A-214N. Each buffer pointer field 214A-214N includes a size field that may be encoded with the size of the buffer and a pointer field encoded with the pointer to the buffer. Additionally, in this embodiment, each buffer pointer field 214A-214N includes a source/destination (S/D) field identifying the pointer as either a source pointer (locating a buffer storing source DMA data) or a destination pointer (locating a buffer to which the DMA data is to be stored). The Tx control circuit 56 may be configured to read the buffer pointer fields 214A-214N to prefetch the DMA data from the source buffers for transmission and to provide the destination pointers to the copy FIFO 42 for transmission to the Rx control circuit 58.

In one embodiment, there may be more than one source pointer for a given destination pointer in the copy descriptor 210. The DMA controller 14 may copy data from the source buffers in the order listed in the copy descriptor 210 into the destination buffer. Thus, the DMA controller 14 may support gathering of scattered data from multiple memory regions into a destination memory region in the copy operation. Similarly, in one embodiment, there may be more than one destination pointer for a given source pointer in the copy descriptor 210. In such embodiments, scatter of the data from the source buffer may be supported.

The exploded view of the transmit header field 212 includes a type field 212A, a style field 212B, a source type field 212C, a destination type field 212D, a logical block length field 212E, and an additional field 212F. The type field 212A and style field 212B may be similar to the type field 202A and style field 202B described above. The source type field 212C and the destination type field 212D may be encoded to indicate how the source buffer pointer(s) and destination buffer pointer(s) should be modified as the DMA transfer progresses. For example, each buffer pointer may be one of the following types, in one embodiment: sequential increment; sequential decrement; or fixed (with various fixed widths, e.g. 1, 2, 4, 8, or 16 bytes). Sequential increment indicates that the address is incremented after each data transmission by the amount of data transmitted. Sequential decrement is similar, but the address is decremented. Sequential increment or sequential decrement may be used for memory regions, where the data is written to sequential memory locations. The fixed option may be used if an address is memory mapped to a register or port of a device, and the width may be the width of each transmission to the register/device. The source type field 212C may also have an encoding for zero, and may be used to write a block of zeros to the destination. The destination type field 212D may also have an encoding for prefetch only, in which the source DMA data is prefetched but not written to a destination. The logical block length field may be used, in some embodiments, to indicate the length of a logical DMA block that may span multiple DMA descriptors. That is, the logical DMA operation may actually be specified using multiple descriptors, and the logical DMA block length may be the length of the logical DMA operation (e.g. the sum total of data transfer over the multiple descriptors).

The additional field 212F includes a few additional control fields, including a serialize indication. The serialize indication may comprise a bit, for example, with the set state requesting serialization and the clear state not requesting serialization (or vice versa). Other embodiments may use a multibit serialize indication having various encodings, if desired.

The XOR circuit 46 may use descriptors that are similar to the transmit DMA descriptor 200. Multiple channels may be assigned to the XOR circuit 46, and descriptors in each of the channels may specify one of the XOR sources. The first channel may also specify the destination for the XOR result (a destination buffer or buffers).

Figure 10:
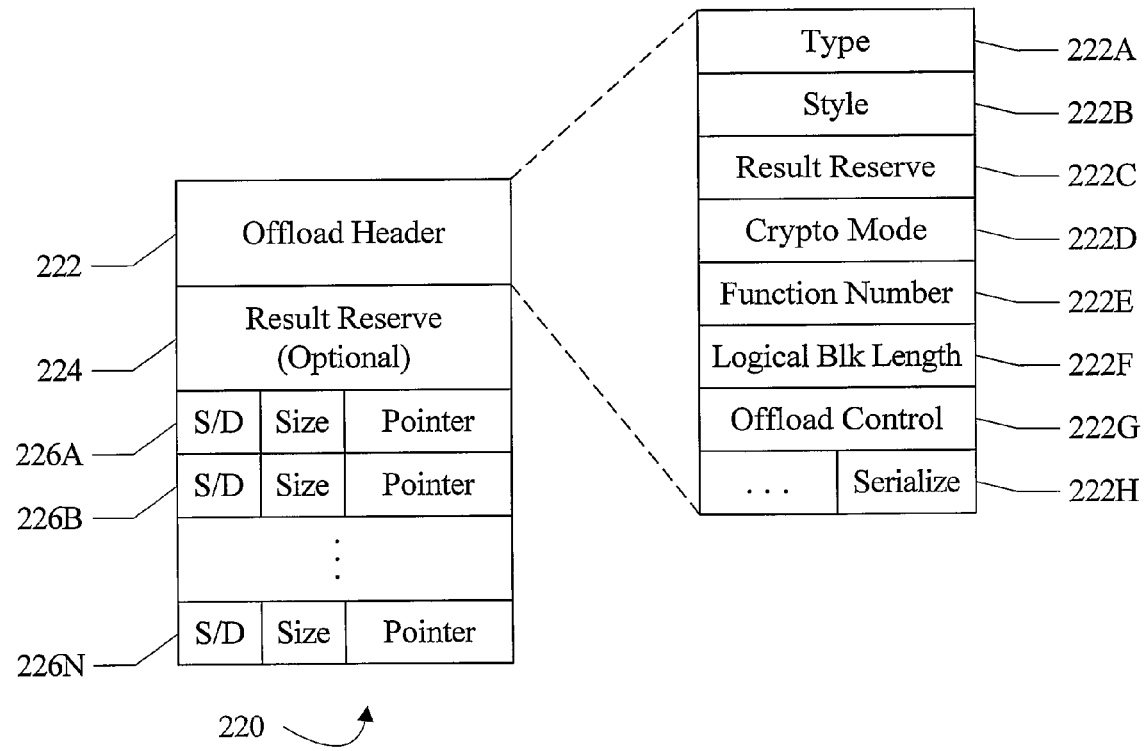
FIG. 10 is a block diagram of one embodiment of an offload DMA descriptor.

FIG. 10 is a block diagram of one embodiment of an offload descriptor 220. The offload descriptor 220 may be the format of descriptors used by the Tx control circuit 56 for DMA transfers that specify the offload engine 44. Thus, the offload descriptor 220 may be used in the descriptor rings 112A-112N that correspond to Tx DMA channels assigned to the offload engine 44. In the embodiment of FIG. 10, the offload descriptor 220 includes a header field 222 (illustrated in exploded view in FIG. 10 for one embodiment), an optional result reserve field 224, and one or more buffer pointer fields 226A-226N. Each buffer pointer field 226A-226N includes a size field that may be encoded with the size of the buffer and a pointer field encoded with the pointer to the buffer. Additionally, in this embodiment, each buffer pointer field 226A-226N includes a source/destination (S/D) field identifying the pointer as either a source pointer (locating a buffer storing source DMA data) or a destination pointer (locating a buffer to which the DMA data is to be stored). The Tx control circuit 56 may be configured to read the buffer pointer fields 226A-226N to prefetch the DMA data from the source buffers and to identify destination buffers, if any. If transformed DMA data is the result of the offload engine 44, there may be destination pointers for the transformed DMA data. If a result separate from the DMA data is generated (e.g. for storage in the result reserve field 224), there may be no destination pointers in some cases and the DMA data may not be written to a destination.

The exploded view of the offload header field 222 includes a type field 222A, a style field 222B, a result reserve field 222C, a crypto mode field 222D, a function number field 222E, a logical block length field 222F, an offload control field 222G, and an additional field 222H. The type field 222A and style field 222B may be similar to the type field 202A and style field 202B described above, and the logical block length field 222F may be similar to the logical block length field 212E described above. The result reserve field 222C may be encoded to indicate whether or not the result reserve field 224 is included in the offload header descriptor 220, and may also indicate the size of the result reserve field 224 (e.g. 64 bit, 192 bit, or 320 bit, in one embodiment). The result reserve field 224 may be used to store the result generated by the offload engine 44, if the result is not transformed DMA data or is generated in addition to transformed DMA data. The crypto mode field 222D may be encoded with the desired mode for the offload engine 44 to process the data, if any. The crypto mode may include none, signature only (e.g. CRC or checksum in the generators 86 or 88), encryption only, decryption only, encryption and hash (with options for hash first or encryption first), or decryption and hash (with options for hash first or decryption first). The function number field 222E may be encoded with the function number for those modes that use the security circuits 84A-84D (e.g. one of eight logical functions formed from the security circuits 84A-84D, as mentioned above). The offload control field 222G may include additional control information for the DMA transfer. For example, the length of each of the signature header, the cipher header, cipher trailer, and the hash size may be included in the offload control field 222G. Similarly, the selected encryption/decryption (cipher) algorithm, hash algorithm, and block cipher mode may be encoded in the offload control field 222G. Various other control bits may be included in the offload control field 222G as well. The additional field 222H may include various other control fields, including the serialize indication similar to the additional field 212F.

Figure 11:
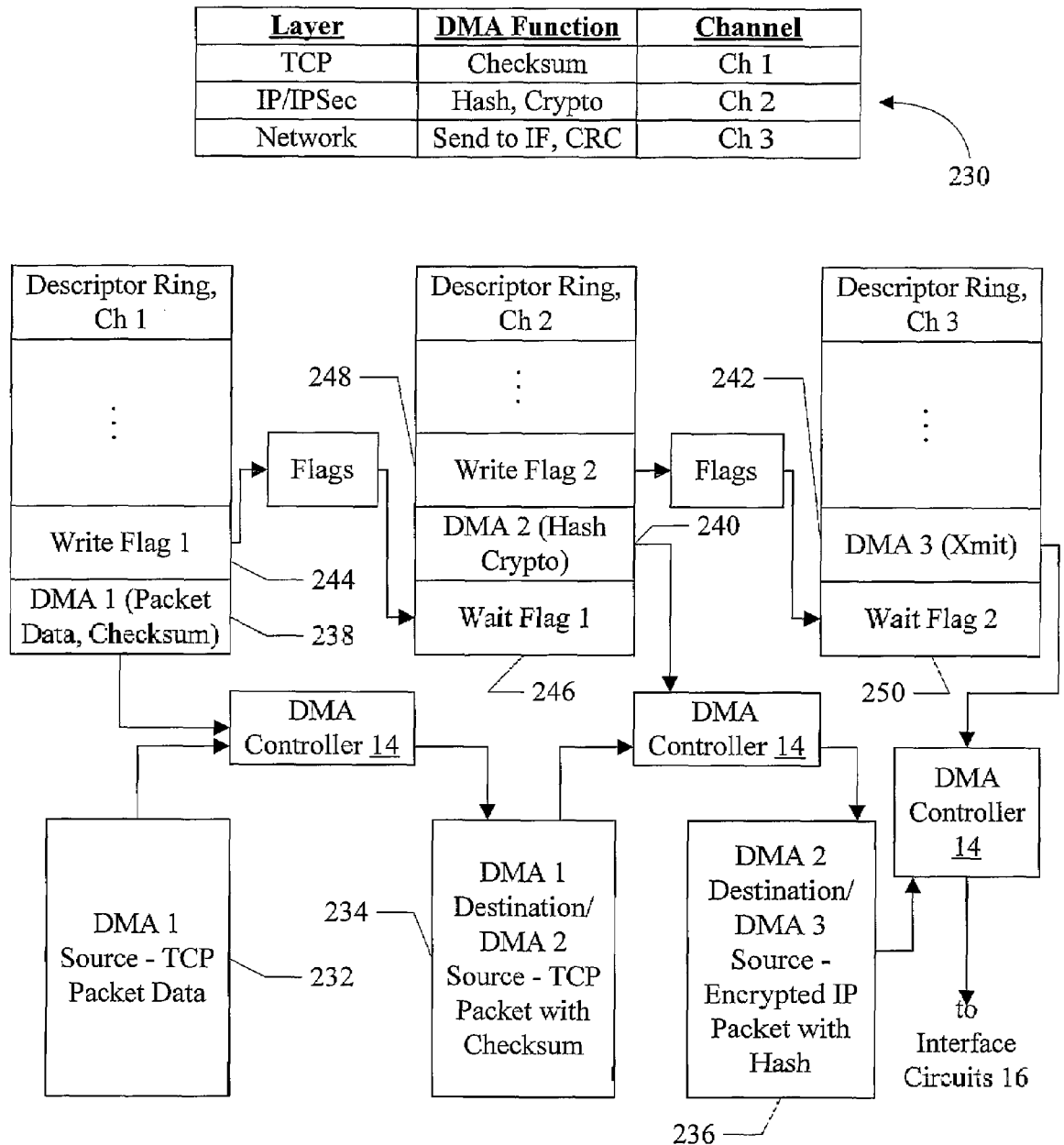
FIG. 11 is a block diagram of one embodiment of TCP/IP processing using the control descriptors.

Turning now to FIG. 11, an example of the use of the flags 72 to control data flow between channels to support TCP/IP processing to send a packet is shown. A table 230 is shown in FIG. 11, illustrating various layers of processing in the TCP/IP stack and DMA functions that can be used to offload some of the processing at those layers. The illustrate layers include the TCP layer, the IP/IPSec layer, and the network layer. For this example, the TCP layer uses DMA channel 1, the IP/IPSec layer uses DMA channel 2, and the network layer uses DMA channel 3. Any set of channels may be used.

At the TCP layer, a packet from the application layers above (not shown in FIG. 11) may be received. The TCP header may be used to encapsulate the packet (e.g. generated by software executing on the processors 18A-18B). The TCP header includes a checksum, which the DMA controller 14 may be used to generate. The TCP packet is then passed to the IP layer, which includes encryption of the TCP packet and adding a hash to the end of the packet. These operations may be offloaded to the DMA controller 14. The IP/IPSec layer processing also includes adding the IPSec and IP headers to the packet, which may be performed by software. Finally, the network layer encapsulates the IP packet with an Ethernet header (and CRC trailer). The DMA controller may be used to transmit the packet and add the CRC, and the Ethernet header may be added by software.

Using the data flow control descriptors, the above processing may be performed for a packet or packets, and the DMA controller 14 may automatically process the packet through the layers. Specifically, software may build three buffers in memory (reference numerals 232, 234, and 236). The buffer 232 may store the TCP packet, with the TCP header generated by software. The buffer 232 may be the source buffer for a first DMA transfer (DMA 1 in FIG. 11) in the channel 1 descriptor ring. The destination buffer for DMA 1 may be the buffer 234, which may also be the source buffer for a second DMA transfer (DMA 2 in FIG. 11) in the channel 2 descriptor ring.

Software may write the IPSec and IP headers to the buffer 234. The destination buffer for the second DMA transfer may be the buffer 236, which may also be the source buffer for a third DMA transfer (DMA 3 in FIG. 11) in the channel 3 descriptor ring. Software may write the Ethernet header to the buffer 236.

Accordingly, software may write a DMA descriptor 238 for DMA 1 that requests the offload engine 44 perform a checksum generation on the DMA data in the source buffer 232 and write the result to the buffer 234. Software may also write a DMA descriptor 240 for DMA 2 in that requests hash and crypto services from the offload engine 44, and has the buffer 234 as the source and the buffer 236 for the destination. Software may write a DMA descriptor 242 for DMA 3, requesting transmission and CRC generation. The source buffer for DMA 3 is buffer 236, and the destination is the interface circuit coupled to the desired network.

To control the data flow between these tasks, software may assign flag 1 to control the handoff from the TCP layer (channel 1) to the IP/IPSec layer (channel 2), and may assign flag 2 to control the handoff from the IP/IPSec layer (channel 2) to the network layer (channel 3). Accordingly, a control descriptor 244 to write flag 1 is included in the descriptor ring for channel 1 after the DMA descriptor 238 and a control descriptor 246 to wait on flag 1 is included in the descriptor ring for channel 2 prior the DMA descriptor 240. Additionally, a control descriptor 248 to write flag 2 is included in the descriptor ring for channel 2 after the DMA descriptor 240 and a control descriptor 250 to wait on flag 2 is included in the descriptor ring for channel 3 prior the DMA descriptor 242. In this fashion, the sequence of DMA transfers can be controlled without interference/extra processing by software.

In a similar fashion, processing of a received packet up the TCP/IP stack may be flow controlled using the flags. In such a case, the channels may be performed in the reverse order of that shown in FIG. 11 may be used, and the opposite operation may be performed (e.g. decryption instead of encryption). Channel 3 may update a flag that is waited on by channel 2, which may update a flag that is waited on by channel 1.

Another example in which the flags may be used is for streaming of packets that use the same security association, key, and initialization vector. The packet may be divided into blocks (e.g. for cipher block chaining (CBC) mode), and XOR and encrypt operations may be performed on the stream of blocks. The first block XORs the initialization vector and the first block of data, and the result is encrypted. Each subsequent block uses the previous encrypted block output as input to the XOR along with the next block of data. Accordingly, a series of dependencies on the DMA data from a previous XOR/encrypt operation to the next is formed, and the flags may be used to control the data flow dependencies so that the entire encryption of the packet may be coded as a series of DMA transfers that can be performed automatically.

Numerous variations and modifications will become apparent to those skilled in the art once the above disclosure is fully appreciated. It is intended that the following claims be interpreted to embrace all such variations and modifications.

What is claimed is:

1. A direct memory access (DMA) controller comprising:
a transmit circuit configured to perform DMA transfers, each DMA transfer described by a DMA descriptor stored in a data structure in memory, where there is a data structure for each DMA channel that is in use, wherein a given DMA descriptor that describes a DMA transfer includes data that defines a source and a target of the DMA transfer, and wherein the transmit circuit is configured to process the given DMA descriptor to determine the source and the target, and wherein the transmit circuit is configured to generate read operations to read data from the source to be transmitted to the target responsive to processing the given DMA descriptor that describes the DMA transfer;
a data flow control circuit coupled to the transmit circuit and configured to control the transmit circuit's processing of DMA descriptors for each DMA channel; and
one or more registers coupled to the data flow control circuit, wherein the one or more registers are configured to store a set of flags, and wherein a first control descriptor is coded to specify a first flag in the set of flags, and wherein, responsive to the first control descriptor in a first data structure corresponding to a first DMA channel, the data flow control circuit is configured to delay processing of subsequent DMA descriptors in the first data structure until the first flag is changed to a first value, and wherein the transmit circuit is configured to process DMA descriptors in other data structures corresponding to other DMA channels while the data flow control circuit is delaying processing of the subsequent DMA descriptors in the first DMA channel.

2. The DMA controller as recited in claim 1 wherein the DMA descriptors for DMA transfers in a transmit DMA channel comprise a serialize indication that indicates whether or not the DMA transfer described by the DMA descriptor is to be serialized with a subsequent DMA transfer in the same DMA channel, and wherein the data flow control circuit is configured to delay the transmit circuit's processing of a subsequent DMA descriptor in the same DMA channel, the subsequent DMA descriptor describing the subsequent DMA transfer, wherein the data flow control circuit is configured to delay the transmit circuit's processing responsive to the serialize indication indicating serialization.

3. The DMA controller as recited in claim 2 further comprising a receive circuit configured to write DMA data of a given DMA transfer to a memory that is the target of the given DMA transfer, wherein the receive circuit is coupled to provide a done indication to the data flow control circuit, wherein the done indication indicates that the DMA data is globally visible.

4. The DMA controller as recited in claim 3 wherein the DMA data is globally visible if write transactions for the DMA data have been coherently ordered on a coherent interconnect to the memory.

5. The DMA controller as recited in claim 2 wherein the transmit circuit is configured to transmit DMA data of a given DMA transfer to an interface circuit that is the target of the given DMA transfer, wherein the transmit circuit considers the given DMA transfer serialized when the last of the DMA data is transmitted to the interface circuit.

6. The DMA controller as recited in claim 1 wherein the first control descriptor is coded to identify a position of the first flag in the one or more registers and that a wait is specified.

7. The DMA controller as recited in claim 6 wherein the first control descriptor is further coded to identify the first value that is being waited on.

8. The DMA controller as recited in claim 1 wherein each flag is a bit, and wherein the first value is either the set state or the clear state of the bit.

9. The DMA controller as recited in claim 1 wherein the one or more registers are software visible, whereby software is able to at least read the set of flags from the one or more registers.

10. The DMA controller as recited in claim 9 wherein software is further able to write the set of flags in the one or more registers.

11. A method comprising:
a direct memory access (DMA) controller performing DMA transfers, each DMA transfer described by a DMA descriptor stored in a data structure in memory, where there is a data structure for each DMA channel that is in use; and
during the performing of the DMA transfers, the DMA controller controlling the processing of DMA descriptors for each DMA channel, wherein a given DMA descriptor that describes a DMA transfer includes data that defines a source and a target of the DMA transfer, and wherein the DMA controller processing the given DMA descriptor includes the DMA controller determining the source and the target, and wherein performing the DMA transfer described by the given DMA descriptor comprises generating read operations to read data from the source to be transmitted to the target, and
the controlling comprising detecting a first control descriptor in a first data structure corresponding to a first DMA channel, wherein the first control descriptor is coded to specify a first flag in the set of flags stored in one or more registers in the DMA controller, and wherein, responsive to detecting the first control descriptor in a first data structure corresponding to a first DMA channel, delaying processing of subsequent DMA descriptors in the first data structure until the first flag is changed to a first value, and processing DMA descriptors in other data structures corresponding to other DMA channels during the delaying processing.

12. The method as recited in claim 11 wherein the DMA descriptors for DMA transfers in a transmit DMA channel comprise a serialize indication that indicates whether or not the DMA transfer described by the DMA descriptor is to be serialized with a subsequent DMA transfer in the same DMA channel, and wherein the controlling the processing comprises delaying the processing of a subsequent DMA descriptor in the same DMA channel, the subsequent DMA descriptor describing the subsequent DMA transfer, and wherein delaying the processing of the subsequent descriptor in the same DMA channel is responsive to the serialize indication indicating serialization.

13. The method as recited in claim 12 wherein performing DMA transfers comprises writing DMA data of a given DMA transfer to a memory that is the target of the given DMA transfer, and the method further comprising providing a done indication to indicate that the DMA data is globally visible.

14. The method as recited in claim 13 wherein the DMA data is globally visible if write transactions for the DMA data have been coherently ordered on a coherent interconnect to the memory.

15. The method as recited in claim 11 wherein the first control descriptor is coded to identify a position of the first flag in the one or more registers and that a wait is specified.

16. The method as recited in claim 15 wherein the first control descriptor is further coded to identify the first value that is being waited on.

17. The method as recited in claim 11 wherein each flag is a bit, and wherein the first value is either the set state or the clear state of the bit.

18. An apparatus comprising:
a host comprising a memory system; and
a direct memory access (DMA) controller coupled to the host, wherein the DMA controller is configured to perform DMA transfers, each DMA transfer described by a DMA descriptor stored in a data structure in the memory system, where there is a data structure for each DMA channel that is in use; and wherein a given DMA descriptor that describes a DMA transfer includes data that defines a source and a target of the DMA transfer, and wherein the DMA controller is configured to process the given DMA descriptor to determine the source and the target, and wherein the DMA controller is configured to generate read operations to read data from the source to be transmitted to the target responsive to processing the given DMA descriptor that describes the DMA transfer, and wherein the DMA controller comprises one or more registers configured to store a set of flags, and wherein the DMA controller is configured to process a control descriptor within a first DMA channel, the control descriptor coded to wait for a given value of at least one flag, and wherein the DMA controller is configured to delay processing in the first DMA channel responsive to the control descriptor until the given value is written to the at least one flag, the delay responsive to the control descriptor, even in the case that the DMA controller has resources available to process DMA descriptors in the first DMA channel.

19. The apparatus as recited in claim 18 wherein the DMA descriptors for DMA transfers in a transmit DMA channel comprise a serialize indication that indicates whether or not the DMA transfer described by the DMA descriptor is to be serialized with a subsequent DMA transfer in the same DMA channel, and wherein the DMA controller is configured to delay the processing of a subsequent DMA descriptor in the same DMA channel, the subsequent DMA descriptor describing the subsequent DMA transfer, wherein the DMA controller is configured to delay the processing responsive to the serialize indication indicating serialization.

20. The apparatus as recited in claim 18 wherein the control descriptor is coded to identify a position of the flag in the one or more registers and that a wait is specified.

21. The apparatus as recited in claim 20 wherein a second control descriptor is coded to identify the position of the flag in the one or more registers and that an update is specified, and wherein the DMA controller is configured to update the flag in response to the second control descriptor.

22. The apparatus as recited in claim 21 wherein the DMA controller is configured to cease delaying the processing of the DMA descriptors in the first DMA channel responsive to the update of the flag.

23. The DMA controller as recited in claim 1 wherein the data flow control circuit is configured to delay processing in the first DMA channel responsive to the control descriptor until the first value is written to the first flag, the delay responsive to the control descriptor, even in the case that the DMA controller has resources available to process DMA descriptors in the first DMA channel.

24. The DMA controller as recited in claim 23 wherein the control descriptor is coded to identify a position of the first flag in the one or more registers and that a wait is specified.

25. The DMA controller as recited in claim 24 wherein a second control descriptor is coded to identify the position of the first flag in the one or more registers and that an update is specified, and wherein the data flow control circuit is configured to update the first flag in response to the second control descriptor.

26. The apparatus as recited in claim 25 wherein the data flow control circuit is configured to cease delaying the processing of the DMA descriptors in the first DMA channel responsive to the update of the first flag.

27. A method comprising:
a DMA controller processing one or more DMA descriptors in a first DMA channel, each DMA descriptor describing a DMA transfer in the first DMA channel;
the DMA controller processing a first control descriptor of a second DMA channel, the first control descriptor identifying a flag in the DMA controller and indicating that an update of the flag to a first value is being waited on, wherein the DMA controller is configured to delay further processing of DMA descriptors in the second DMA channel responsive to the first control descriptor until the flag is updated to the first value;
the DMA controller processing a second control descriptor in the first DMA channel subsequent to the one or more DMA descriptors, the second control descriptor identifying the flag and indicating an update of the flag to the first value;
the DMA controller updating the flag responsive to the second control descriptor; and
the DMA controller processing one or more second DMA descriptors in the second DMA channel responsive to the update.

28. The DMA controller as recited in claim 1 wherein a second control descriptor is coded to specify an update of the first flag to the first value, and wherein, responsive to the second control descriptor in a second data structure corresponding to a second DMA channel, the data flow control circuit is configured to update the first flag in the one or more registers to the first value.

29. The DMA controller as recited in claim 28 wherein the data flow control circuit is configured to terminate the delayed processing of DMA descriptors in the first data structure responsive to updating the first flag to the first value.

30. The DMA controller as recited in claim 28 wherein the second control descriptor is further coded to identify the first value to which the first flag is being updated.

* * * * *